United States Patent
Oh et al.

(10) Patent No.: US 12,322,058 B2
(45) Date of Patent: Jun. 3, 2025

(54) ELECTRONIC DEVICE, METHOD AND NON-TRANSITORY STORAGE MEDIUM FOR IMAGE PROCESSING

(71) Applicant: SAMSUNG ELECTRONICS CO., LTD., Suwon-si (KR)

(72) Inventors: Sanghoon Oh, Suwon-si (KR); Daemyung Kim, Suwon-si (KR); Jungeun Lee, Suwon-si (KR); Ilhoe Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 17/856,456

(22) Filed: Jul. 1, 2022

(65) Prior Publication Data

US 2022/0335701 A1  Oct. 20, 2022

Related U.S. Application Data

(63) Continuation of application No. PCT/KR2020/019446, filed on Dec. 30, 2020.

(30) Foreign Application Priority Data

Jan. 3, 2020  (KR) .................. 10-2020-0001050

(51) Int. Cl.
   *G06T 19/20*  (2011.01)
(52) U.S. Cl.
   CPC .......... *G06T 19/20* (2013.01); *G06T 2200/24* (2013.01); *G06T 2219/2016* (2013.01)

(58) Field of Classification Search
   CPC ................. G06T 19/20; G06T 2200/24; G06T 2219/2016
   See application file for complete search history.

(56) References Cited

U.S. PATENT DOCUMENTS

| 2010/0020072 A1 | 1/2010 | Mohammed Amin et al. |
| 2011/0243388 A1 | 10/2011 | Sakaguchi et al. |

(Continued)

FOREIGN PATENT DOCUMENTS

| JP | 201190400 A | 5/2011 |
| KR | 2000-0038102 A | 7/2000 |

(Continued)

OTHER PUBLICATIONS

International Search Report (PCT/ISA/210) and Written Opinion (PCT/ISA/237) dated Apr. 8, 2021 issued by the International Searching Authority in International Application No. PCT/KR2020/019446.

(Continued)

*Primary Examiner* — Samantha (Yuehan) Wang
(74) *Attorney, Agent, or Firm* — Sughrue Mion, PLLC

(57) ABSTRACT

An electronic device includes a memory, a display and a processor configured to set at least one virtual plane in a three-dimensional (3D) virtual position based on at least a portion of at least one two-dimensional (2D) first image displayed on the display, set a 3D virtual space comprising the at least one virtual plane and the at least one 2D first image, insert a 3D object into the 3D virtual space, and generate at least one 2D second image by synthesizing the 3D object inserted into the 3D virtual space and the at least one 2D first image.

15 Claims, 24 Drawing Sheets

| Object type | | Plane Attach type (510) | | Plane Interaction type (520) | |
|---|---|---|---|---|---|
| | | Static type | Animated type | Static type | Animated type |
| Asset | Media | O (image, video) | | | |
| | Text | O | O | O (Shadowed text) | O (Standing text) |
| | Effect: VFX | | O (Magic circle) | | O (Soap bubble text) |
| | Sticker. Emotion | | | | O (Joy, anger) |
| | Sticker. 2D Sticker | O (PNG image) | | | |
| | Sticker. 3D Sticker | | | | O (Like, subscribe, etc.) |

(56) References Cited

U.S. PATENT DOCUMENTS

| | | | | |
|---|---|---|---|---|
| 2012/0092367 | A1* | 4/2012 | Suzuki | G06T 19/006 |
| | | | | 345/632 |
| 2017/0102791 | A1* | 4/2017 | Hosenpud | H04N 13/324 |
| 2018/0075660 | A1* | 3/2018 | Jouet | G06T 5/20 |
| 2018/0095616 | A1 | 4/2018 | Valdivia et al. | |
| 2018/0174366 | A1* | 6/2018 | Nishibe | G06F 3/013 |
| 2018/0181199 | A1 | 6/2018 | Harvey et al. | |
| 2021/0056751 | A1* | 2/2021 | Zhao | H04N 23/54 |
| 2021/0233330 | A1* | 7/2021 | Sutherland | G06F 3/011 |

FOREIGN PATENT DOCUMENTS

| | | |
|---|---|---|
| KR | 1020130067882 A | 6/2013 |
| KR | 10-2017-0054068 A1 | 5/2017 |
| KR | 1020180020725 A | 2/2018 |
| KR | 101919077 B1 | 11/2018 |

OTHER PUBLICATIONS

Communication issued on Nov. 27, 2023 by the Korean Intellectual Property Office in Korean Patent Application No. 10-2020-0001050.

* cited by examiner

| Object type | | Plane Attach type (510) | | Plane Interaction type (520) | |
|---|---|---|---|---|---|
| | | Static type | Animated type | Static type | Animated type |
| Asset | Media | ○ (image, video) | | | |
| | Text | ○ | | ○ (Shadowed text) | ○ (Standing text) |
| | Effect: VFX | | ○ (Magic circle) | | ○ (Soap bubble text) |
| | Sticker. Emotion | | | | ○ (Joy, anger) |
| | Sticker. 2D Sticker | ○ (PNG image) | | | |
| | Sticker. 3D Sticker | | | | ○ (Like, subscribe, etc.) |

FIG. 5B

ELECTRONIC DEVICE, METHOD AND NON-TRANSITORY STORAGE MEDIUM FOR IMAGE PROCESSING

CROSS-REFERENCE TO RELATED APPLICATION(S)

This application is by-pass continuation application of International Application No. PCT/KR2020/019446 filed on Dec. 30, 2020, in the Korean Intellectual Property Receiving Office, which is based on and claims priority to Korean Patent Application No. 10-2020-0001050, filed on Jan. 3, 2020, in the Korean Intellectual Property Office, the disclosures of which are incorporated by reference herein in their entireties.

BACKGROUND

1. Field

The disclosure relates to an electronic device, a method, and a non-transitory storage medium for image processing for providing a three-dimensional (3D) effect.

2. Description of Related Art

The technology for image processing may process an image by adding text, images, animations, or sounds to one or more images and provide content that meets the user's preference according to the processed image.

An electronic device for a general image processing technique may capture a three-dimensional (3D) image using a camera (e.g., depth camera) for 3D capturing based on augmented reality and apply a 3D object to the 3D space of the captured 3D image to create augmented reality-based content. The electronic device for image processing may change the 3D object into a two-dimensional (2D) image based on an image synthesis technique and synthesize the changed 2D image with the captured 2D image to thereby apply the 3D object to the 2D image Since major general image processing techniques process images using the result of analysis of the 2D image, and actual synthesis solutions are based on synthesizing an image and another image, such methods are primarily used that convert 3D rendering images into 2D images and synthesize them.

However, the general image processing technique requires 3D-to-2D image conversion to process the 3D image and suffers from a complicated image processing process and need for additional components for image processing.

Further, a generally captured image is a 2D image and, to provide a 3D image, a 3D image may be processed by identifying 3D space information from the 3D image captured using a 3D capturing camera (e.g., depth camera).

The 3D capturing camera is expensive and is not widely used in reality. Further, with a general electronic device for image processing, it is difficult to identify information about the 3D space in a situation without a 3D capturing camera. Thus, only with general image processing technology, it is hard to provide a 3D effect to a 2D first image to be displayed on a display.

SUMMARY

Provided are an electronic device, method, and non-transient storage medium, for providing a three-dimensional (3D) effect to a two-dimensional (2D) image.

Additional aspects will be set forth in part in the description which follows and, in part, will be apparent from the description, or may be learned by practice of the presented embodiments.

According to an aspect of the disclosure, an electronic device includes: a memory; a display; and a processor configured to: set at least one virtual plane in a three-dimensional (3D) virtual position based on at least a portion of at least one two-dimensional (2D) first image displayed on the display, set a 3D virtual space including the at least one virtual plane and the at least one 2D first image, insert a 3D object into the 3D virtual space, and generate at least one 2D second image by synthesizing the 3D object inserted into the 3D virtual space and the at least one 2D first image.

The processor may be further configured to: control the display to display the at least one 2D second image, map the at least one 2D second image with reproduction time information related to the at least one 2D first image, and store the mapped at least one 2D image in the memory.

The processor may be further configured to: identify a 2D position on the display to which the at least one virtual plane is projected, control the display to display a first control object for controlling the at least one virtual plane in the 2D position, and based on an edit request, execute an application for image processing and control the display to display an execution screen of the application including the at least one 2D first image and menus for processing the at least one 2D first image, and the first control object may be overlaid on a portion of the at least one 2D first image displayed in the 2D position and is configured to adjust at least one of a size, movement, rotation, or depth of the at least one virtual plane.

The processor may be further configured to: set a first virtual position for inserting the 3D object in the 3D virtual space based on a first type selected from among types for inserting the 3D object, the first virtual position being a 3D virtual position in which at least a portion of the 3D object is attached to the at least one virtual plane, add the 3D object in the first virtual position, control the display to display a second control object for controlling the 3D object, the second control object being displayed in a 2D position on an area of the display to which the 3D object is projected, and set a 3D visual effect by controlling the 3D object using the second control object, and the 3D object added in the first virtual position is configured to be capable of at least one of rotation about one axis, movement or resizing with respect to two axes.

The processor may be further configured to: set a second virtual position for inserting the 3D object in the 3D virtual space based on a second type selected from among types for inserting the 3D object, the second virtual position being a 3D virtual position in which the 3D object does not overlap the at least one virtual plane, add the 3D object in the second virtual position, control the display to display a third control object for controlling the 3D object, the third control object being displayed in a 2D position on an area of the display to which the 3D object is projected, and set a 3D visual effect by controlling the 3D object using the third control object, and the 3D object may be added in the second virtual position is configured to be capable of at least one of rotation about three axes, movement or resizing with respect to the three axes.

The processor may be further configured to: set an additional virtual plane based on a predetermined number of virtual planes or an additional selection, and based on the at least one virtual plane including a plurality of virtual planes, set a 3D visual effect to the 3D object such that the 3D object dynamically moves within the 3D virtual space without departing from the plurality of virtual planes in the 3D virtual space set by the plurality of virtual planes.

The processor may be further configured to: identify a moved position of the 3D object, based on a request for moving the 3D object from a first virtual plane among the at least one virtual plane to a second virtual plane, rotate the 3D object to allow the moved position of the 3D object to be parallel with the second virtual plane based on the moved position of the 3D object being a position in a boundary line of the second virtual plane, and insert the rotated 3D object into the second virtual plane.

The processor may be further configured to: obtain a plurality of first images included in a reproduction time period from a first time for reproducing image data including the at least one 2D first image to a second time, the plurality of first images including the at least one 2D first image, generate 2D second images respectively corresponding to the plurality of first images by applying the 3D object, inserted into the 3D virtual space, to each of the plurality of first images, and map the plurality of first images included in the reproduction time period to each of the 2D second images, or replace the plurality of first images with the 2D second images and store the 2D second images in the memory.

According to an aspect of the disclosure, a method for image processing in an electronic device, includes: setting at least one virtual plane in a three-dimensional (3D) virtual position related to at least a portion of at least one dimensional (2D) first image displayed on a display of the electronic device; setting a 3D virtual space including the at least one virtual plane and the at least one 2D first image; inserting a 3D object into the 3D virtual space; and generating at least one 2D second image by synthesizing the 3D object inserted into the 3D virtual space and the at least one 2D first image.

The method may further include: controlling the display to display the at least one 2D second image; mapping the at least one 2D second image with reproduction time information related to the at least one 2D first image; and storing the mapped at least one 2D second image in a memory.

The method may further include: identifying a 2D position on the display to which the at least one virtual plane is projected; and controlling the display to display a first control object for controlling the at least one virtual plane in the 2D position, the first control object may be overlaid on a portion of the at least one 2D first image displayed in the 2D position and adjusts at least one of a size, movement, rotation, or depth of the at least one virtual plane, and the method may further include, based on an edit request, executing an application for image processing and controlling the display to display an execution screen of the application including the at least one 2D first image and menus for processing the at least one 2D first image.

The inserting the 3D object into the 3D virtual space may include: setting a first virtual position for inserting the 3D object in the 3D virtual space based on a first type selected from among types for inserting the 3D object, the first virtual position being a 3D virtual position in which at least a portion of the 3D object is attached to the at least one virtual plane; adding the 3D object to the first virtual position; controlling the display to display a second control object for controlling the 3D object, the second control object being displayed in a 2D position on an area of the display to which the 3D object is projected; and setting a 3D visual effect by controlling the 3D object using the second control object, and the 3D object added in the first virtual position may be configured to be capable of at least one of rotation about one axis, movement or resizing with respect to two axes.

The inserting the 3D object into the 3D virtual space may include: setting a second virtual position for inserting the 3D object in the 3D virtual space based on a second type selected from among types for inserting the 3D object, the second virtual position being a 3D virtual position in which the 3D object does not overlap the at least one virtual plane; adding the 3D object to the second virtual position; controlling the display to display a third control object for controlling the 3D object, the third control object being displayed in a 2D position on an area of the display to which the 3D object is projected; and setting a 3D visual effect by controlling the 3D object using the third control object, and the 3D object added in the second virtual position may be configured to be capable of at least one of rotation about three axes, movement or resizing with respect to the three axes.

The inserting the 3D object into the 3D virtual space may include: identifying a moved position of the 3D object, based on a request for moving the 3D object from a first virtual plane among the at least one virtual plane to a second virtual plane; rotating the 3D object to allow the moved position of the 3D object to be parallel with the second virtual plane based on the moved position of the 3D object being a position in a boundary line of the second virtual plane; and inserting the rotated 3D object into the second virtual plane. According to an aspect of the disclosure, a non-transitory computer-readable storage medium stores instructions that, when executed by a processor, cause the processor to: set at least one virtual plane in a three-dimensional (3D) virtual position related to at least a portion of at least one two-dimensional (2D) first image displayed on a display of an electronic device; set a 3D virtual space including the at least one virtual plane and the at least one 2D first image; insert a 3D object into the 3D virtual space; and generate at least one 2D second image by synthesizing the 3D object inserted into the 3D virtual space and the at least one 2D first image.

By the electronic device and operation method in the electronic device according to an embodiment, it is possible to identify information about a 3D space related to a 2D image even in a situation free of a camera for 3D capturing (e.g., depth camera) and simply provide a 3D effect to a 2D image by generating a synthesized image of a 2D image and a 3D object using an image processing application.

By the electronic device and operation method in the electronic device according to an embodiment, it is also possible to simply perform image processing for providing a 3D effect using an image processing application without the need for performing a complicated process to process a 3D object into a 2D image.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 5A and 5B are diagrams of an example for image processing in an electronic device according to an embodiment;

DETAILED DESCRIPTION

Various embodiments of the present disclosure are now described with reference to the accompanying drawings.

Figure 1:
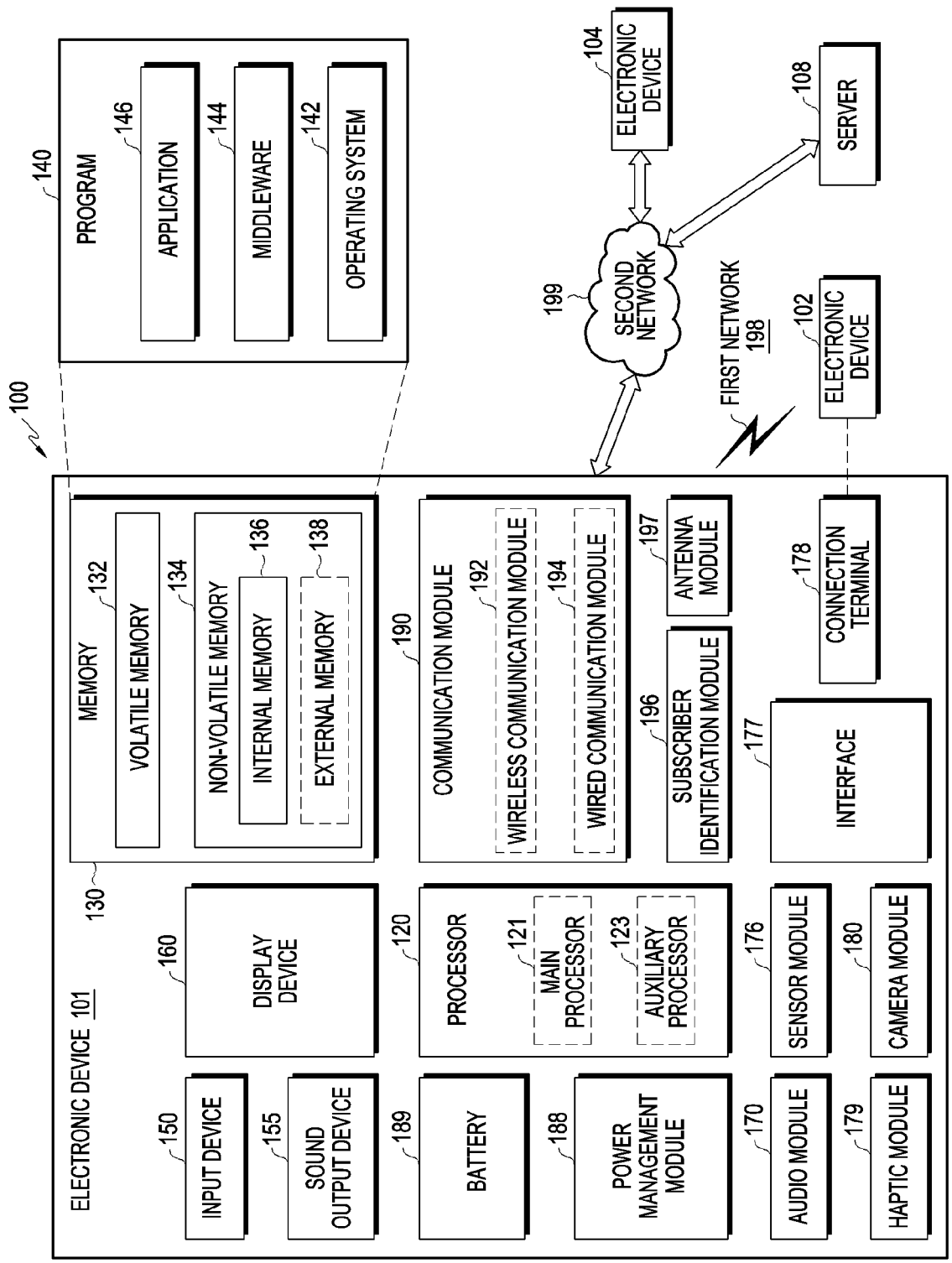
FIG. 1 is a diagram of a network environment according to various embodiments.

FIG. 1 is a diagram of a network environment according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include one or more antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
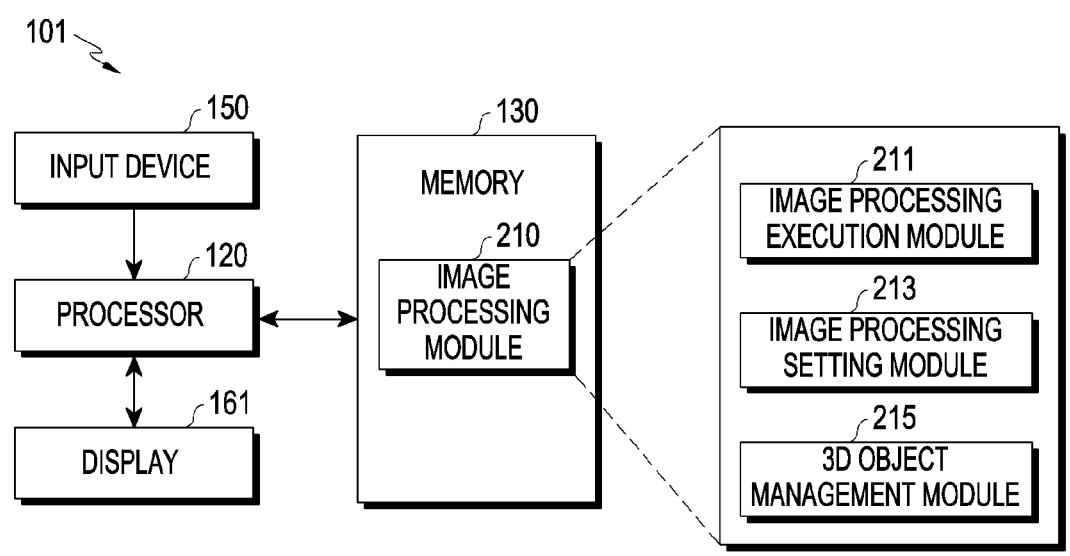
FIG. 2 is a diagram of an example configuration of an electronic device according to an embodiment.

FIG. 2 is a diagram of an example configuration of an electronic device according to an embodiment.

Referring to FIGS. 1 and 2, according to an embodiment, an electronic device 101 (e.g., the first electronic device 101 of FIG. 1) may include a processor 120, a memory 130, an input device 150, and a display 161 (e.g., the display device 160 of FIG. 1). Further, the electronic device 101 described with reference to FIG. 2 may further include other components described with reference to FIG. 1.

According to an embodiment, the processor 120 of the electronic device 101 may be configured to operate while being electrically connected to the memory 130, the input device 150, and the display 161.

According to an embodiment, the processor 120 of the electronic device 101 may be configured to obtain image data including two-dimensional (2D) images (hereinafter, referred to as a first image) for image processing and to perform an operation for processing at least one 2D first image included in the obtained image data. To process the at least one 2D first image, the processor 120 may execute an application (program or function) for image processing stored in the memory 130. The image data may be at least one still image (image or photo) or a moving image (or video). The processor 120 may set at least one virtual plane in a three-dimensional (3D) virtual position related to at least a portion of the at least one 2D first image (still image or frame) displayed on the display 161, using the executed application. The processor 120 may set a 3D virtual plane including the at least one set virtual plane and the at least one first image, insert a 3D object into the set 3D virtual plane, and synthesize the 3D object inserted into the set 3D virtual plane and the at least one first image displayed, generating at least one 2D synthesized image (hereinafter, referred to as a second image). The processor 120 may be configured to apply the at least one second image to the image data and play it, by mapping the at least one 2D first image to the at least one 3D object-inserted 2D second image or replacing with the at least one 3D object-inserted 2D second image. The at least one first image may be at least one 2D image of, for example, a main image, a thumbnail image, an intro image, or an outro image provided using the executed application for image processing.

According to an embodiment, the processor 120 may identify the position of the first image (e.g., the 2D position (x, y coordinates) in the display area displaying the first image) displayed on the display 161 to which the at least one set virtual plane is projected, using at least one sensor. The processor 120 may control the display 161 to display a first control object for controlling the at least one virtual plane in the 2D position. The first control object may be displayed overlaid on part of the at least one first image displayed in the 2D position and be configured to adjust at least one of the size, movement, rotation, or depth of the at least one virtual plane.

According to an embodiment, the processor 120 of the electronic device 101 may control to obtain image data of the at least one first image (image, still image, or picture) or moving image (video or dynamic image) and store the obtained image data. The processor 120 may be configured to process the operation of the image processing module 210 included in the memory 130. The processor 120 may be configured to process operations related to image reproduction. The processor 120 may process (e.g., encode and decode) the image or image data using a predetermined image processing format. The processor 120 may perform image processing (e.g., encoding or decoding) on at least one image using a predetermined image processing format.

According to an embodiment, the memory 130 of the electronic device 101 may be configured to including the image processing module 210 corresponding to at least one application (e.g., the application 146 of FIG. 1 (e.g., an application for image processing)) processed and executed by the processor 120. The memory may store multimedia content and store 3D objects for applying a 3D effect to part of a video or at least one first image for the multimedia content. The image processing module 210 may be configured software-wise, as a module corresponding to a program (e.g., the program 140 of FIG. 1) and may correspond to an application for image processing (e.g., the application 146 of FIG. 1).

According to an embodiment, the image processing module 210 may store instructions that, when executed by the processor 120, enable the processor 120 to perform setting at least one virtual plane in a 3D virtual position related to at least a portion of at least one 2D first image displayed on the display 161, setting a 3D virtual space including the at least one virtual plane and the at least one first image, inserting a 3D object into the 3D virtual space, and generating at least one 2D second image by synthesizing the 3D object inserted into the 3D virtual space and the at least one first image.

According to an embodiment, the image processing module 210 may be configured to include executable instructions that, when executed by the processor 120, enable the processor 120 to perform operations related to image processing on at least part of a video or at least one first image.

According to an embodiment, the image processing module 210 may be configured to include executable instructions that, when executed by the processor 120, enable the processor 120 to perform an operation for applying a 3D effect to at least one first image which is at least part of a video frame in response to a request for image processing. The image processing module 210 may include an image processing execution module 211, an image processing setting module 213, and a 3D object management module 215 to apply a 3D effect. However, the components included in the image processing module 210 are not limited thereto, and the image processing module 210 may further include other modules. The image processing execution module 211, the image processing setting module 213, and the 3D object management module 215 may be software modules and correspond to at least part of the image processing application. According to an embodiment, although the image processing module 210 is described as being a software module, embodiments are not limited thereto, and the whole or at least part of the image processing module 210 may be configured as a hardware module.

According to an embodiment, the processor 120 may execute the application for image processing by execution of the image processing execution module 211, set execution screens for image-processing at least one first image, and control the display 161 to display the set execution screens. The processor 120 may perform operations related to reproduction of image data by execution of the image processing execution module 211 and control the display 161 to select and display at least one 2D first image for image processing on the image data. The processor 120 may control to display and store at least one second image generated by the image processing setting module 213 by execution of the image processing execution module 211.

According to an embodiment, by execution of the image processing setting module 213, the processor 120 may set at least one virtual plane related to at least one 2D first image, set a 3D virtual space based on the at least one set virtual plane, and set to insert a 3D object into the set 3D virtual space. By execution of the image processing setting module 213, the processor 120 may set a first control object for adjusting the size, movement, rotation, or depth of the at least one set virtual plane and set at least one of a second control object or third control object for adjusting the size, movement, rotation, or depth of the 3D virtual object inserted into the 3D virtual space. By execution of the image processing setting module 213, the processor 120 may generate at least one 2D second image by synthesizing the 3D object inserted into the set 3D virtual space and at least one 2D first image. By execution of the image processing setting module 213, the processor 120 may display the at least one generated 2D second image on the execution screen, map the at least one generated second image with information related to the reproduction time of the at least one first image (e.g., a reference point for image processing of a timeline) and store it in the memory 130. By execution of the image processing setting module 213, the processor 120 may map the at least one generated second image with the at least one first image and store it in the memory 130 or may replace the at least one first image with the at least one second image and store it in the memory 130. According to an embodiment, by execution of the image processing setting module 213, if a predetermined reproduction time (cut) is selected on a time ruler of the timeline, the processor 120 may insert the 3D object into the first image corresponding to the selected reproduction time (cut), generating the second image. According to an embodiment, by execution of the image processing setting module 213, upon selecting to process a first image to be reproduced during a predetermined reproduction time period on the time ruler of the timeline, the processor 120 may insert the same 3D object into the first images (frames) corresponding to the reproduction time period from the selected start point ($T_{cut0}$) to the end point ($T_{cut1}$), generating each second image. The 3D object may be inserted into each of a plurality of first images of the reproduction time period selected in the same 3D virtual position and under the same insertion condition (e.g., a condition related to at least one of the type of the 3D object, movement, lighting, material, shape, size, color, or brightness). By execution of the image processing setting module 213, the processor 120 may set the at least one set virtual plane and set 3D virtual space to be identical for the plurality of first images of the selected reproduction time period and may insert the 3D object, which is dynamically moved over time, onto the 3D virtual space set as identical.

According to an embodiment, by execution of the image processing setting module 213, the processor 120 may set at least one virtual plane in the virtual 3D position corresponding to the at least one 2D first image. By execution of the image processing setting module 213, the processor 120 may set at least one of the set type of the virtual plane, the set position of the virtual plane, the number of virtual planes, or the shape of the virtual plane. By execution of the image processing setting module 213, the processor 120 may control the display 161 to display at least one menu (e.g., a menu for indicating at least one of the set type of the virtual plane, the set position of the virtual plane, the number of the virtual planes, or the shape of the vehicle) for setting the virtual plane on the execution screen of image processing. By execution of the image processing setting module 213, the processor 120 may set a 3D virtual space including the set virtual plane and the at least one 2D first image. By execution of the image processing setting module 213, the processor 120 may set a control object for controlling the set 3D virtual space and control the display 161 to display the control object overlaid on the at least one 2D first image.

According to an embodiment, by execution of the 3D object management module 215, the processor 120 may configure, or obtain from an external device, at least one 3D object to be inserted into the 3D virtual space to apply a 3D effect to the at least one first image, and control to store the at least one configured or obtained 3D object in the memory 130. By execution of the 3D object management module 215, the processor 120 may transfer at least one selected from among the 3D objects stored in the memory 130 to the image processing execution module 211 or the image processing setting module 213 to synthesize with the at least one 2D first image. By execution of the 3D object management module 215, the processor 120 may generate or edit a 3D object using the text or image input from the user through the input device 150.

According to an embodiment, the image processing module 210 may include at least one of a 3D deco module, a thumbnail module, an intro module, an outro module, a subtitle module, an edit module, an export module, or a setup module. The image processing execution module 211, the image processing setting module 213, and the 3D object management module 215 may be included in, e.g., the 3D deco module.

According to an embodiment, the display 161 of the display device 160 in the electronic device may display screens related to the application for image processing corresponding to the image processing module 210 executed by the processor 120. The display 161 may display at least one first image or a video. The display 161 may display at least part of the video or at least one first image to be processed through the application for image processing and display the second image generated by processing the at least part of the video or at least one first image.

Major components of the electronic device 101 have been described above in connection with FIG. 2. According to an embodiment, however, all of the components of FIG. 2 are not essential components, and each electronic device 101 may be implemented with more or less components than those shown. The positions of the major components of each electronic device 101 described above in connection with FIG. 2 may be varied according to various embodiments.

FIGS. 3A, 3B, 3C and 3D are diagrams of an example of an edit screen of an electronic device according to an embodiment. Described in connection with FIGS. 3A to 3D is an example of processing at least one first image corresponding to at least one frame of a video executed on an application for convenience of description, and a plurality of still images, such as photos, may be edited in the same manner.

Figure 3A:
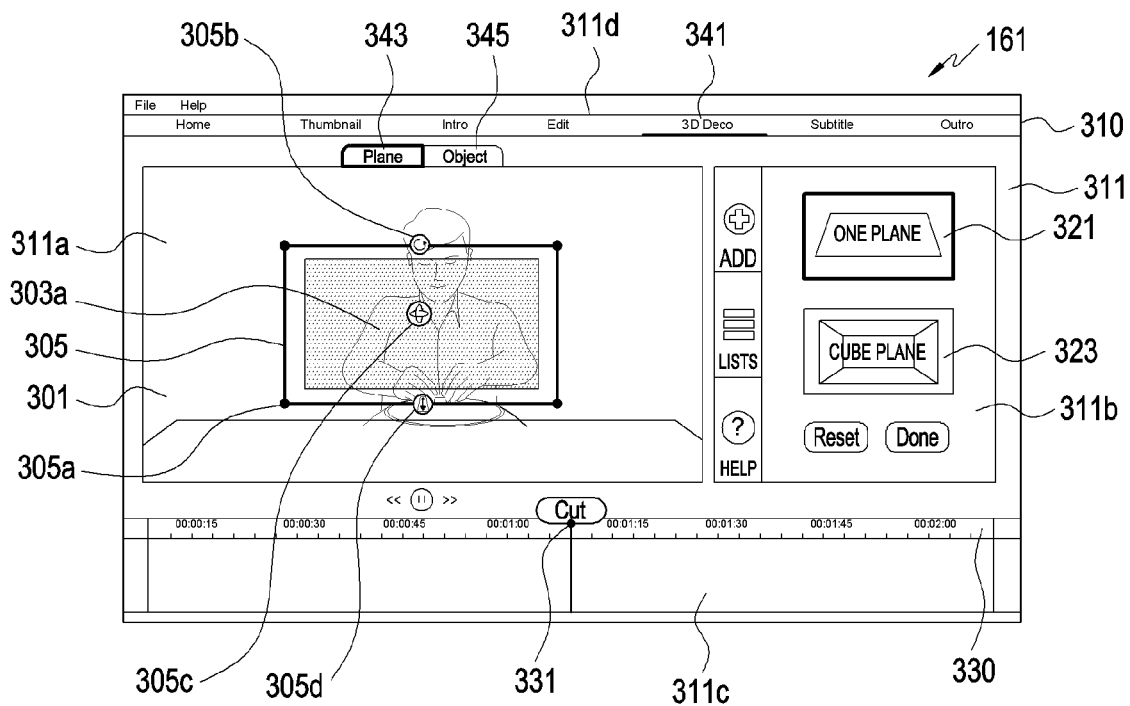
FIGS. 3A, 3B, 3C and 3D are diagrams of an example of an edit screen of an electronic device according to an embodiment.
Figure 3B:
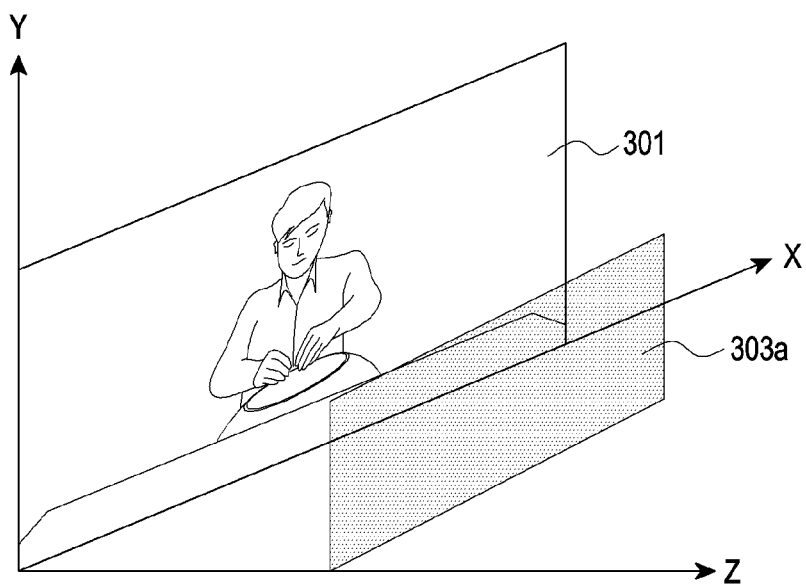

Referring to FIGS. 3A and 3B, according to an embodiment, a processor (e.g., the processor (e.g., the processor 120 of FIGS. 1 and 2) of an electronic device (e.g., the electronic device 101 of FIGS. 1 and 2) may control the image processing module 210 stored in the memory 130 to execute an application (program or function) 310 for image processing. If the application for image processing is executed, the processor 120 may control the display 161 to display an execution screen 311 for image processing. The execution screen 311 may be an execution screen displayed by execution of a 3D deco module, e.g., according to selection of a menu (image, button, or object) 341 indicating the 3D deco module. The execution screen 311 may be set as a first area 311a for displaying at least one first image 301, a second area 311b for displaying information indicating the type of the virtual plane or information related to selection or input of 3D objects to be applied onto the virtual plane, a third area 311c for displaying an image (e.g., timeline or time ruler) 330 related to the reproduction time of the video, and a fourth area 311d for displaying a menu (image, button, or object) (e.g., at least one of a home, thumbnail, intro, edit, 3D deco subtitle, or outro) indicating at least one operation (e.g., modules included in the image processing module 210) of the application (program or function) 310 for image processing. The fourth area 311d of the execution screen 311 may include a menu (image, button, or object) 343 for indicating the operation for setting the virtual plane and a menu (image, button, or object) 345 for indicating the operation for inputting or selecting the 3D object. The second area 311b of the execution screen 311 may include at least one of a menu (image, button, or object) for indicating virtual plane setting types 321 and 323, a menu (image, button, or object) (add) selectable to add a new virtual plane, a menu (image, button, or object) (list) for displaying the virtual plane set thus far, or a menu (help) for guiding a method for inserting a virtual plane. The second area 311b may further include various menus (image, button, or object) for processing. The processor 120 may control the display 161 to display, in the first area 311a, a 2D (x, y) first image (still image or frame) corresponding to the reproduction time ($T_{cut0}$) 331 selected from the obtained video data in response to an image processing request. As shown in FIG. 3B, in response to selection of a first type (e.g., one plane) 321 from among the virtual plane setting types on the execution screen 311, the processor 120 may set at least one virtual plane 303a in a virtual 3D (x, y, z) position so that at least part of the 2D first image 301 displayed on the first area 311a is positioned apart in the vertical direction and in parallel therewith. The processor 120 may display a first control object 305 on the first area 311a to overlap at least part of the 2D first image. The first control object 305 may include at least one of a first element 305a (e.g., vertexes or guide line of the rectangular box) of the x- and y-axis movement for resizing the virtual plane 303a, a second element 305b for rotation on the z axis for rotation, a third element 305c of left/right rotation on the y axis or upward/downward rotation on the x axis for rotation, or a fourth element 305d of movement on the z axis for depth adjustment. The first control object 305 may be automatically set and displayed as the menu displayed on the execution screen 311 is selected or at least one virtual plane is set. The first control object 305 may perform one-axis rotation or two-axis movement.

Figure 3C:
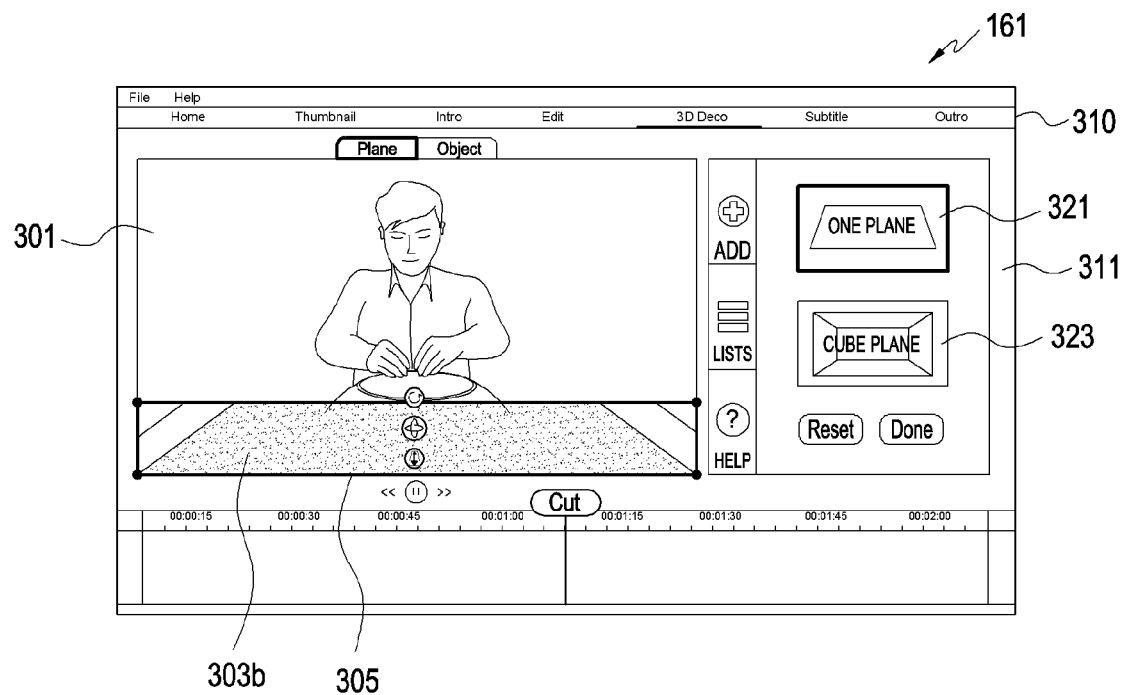
Figure 3D:
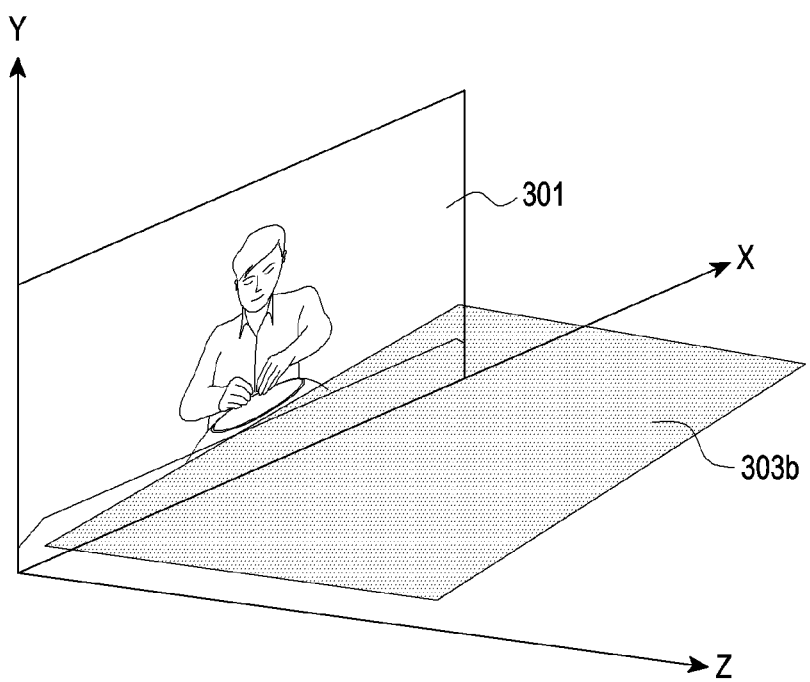

Referring to FIGS. 3C and 3D, the processor 120 may change the virtual plane 303a by adjusting the size, movement, or rotation of the control object 305 to allow the virtual plane 303a to correspond to another area of the 2D first image 301. As the control object 305 is manipulated, the virtual plane 303a may be rotated by 90 degrees, with its x axis fixed, so that the processor 120 may set a changed virtual plane 303b as shown in FIG. 3D. As shown in FIG. 3A or 3C, as a predetermined number of virtual planes or a first type (e.g., one plane) 321 for setting a virtual plane is additionally selected, the processor 120 may additionally set another virtual plane in another 3D virtual position (x, y, and z values). For example, the processor 120 may adjust the control object 305 to allow the virtual plane 303a to be rotated by 90 degrees, with the y axis of the added virtual plane fixed, to thereby change the 3D virtual position of the other virtual plane so that a virtual wall surface may be formed on the y-axis side surface perpendicular to the virtual plane 303b.

FIGS. 4A, 4B, 4C and 4D are diagrams of an example for image processing in an electronic device according to an embodiment. Described in connection with FIGS. 4A to 4D is an example of processing at least one first image corresponding to at least one frame of a video executed on an application for convenience of description, and a plurality of still images, such as photos, may be processed in the same manner.

Figure 4A:
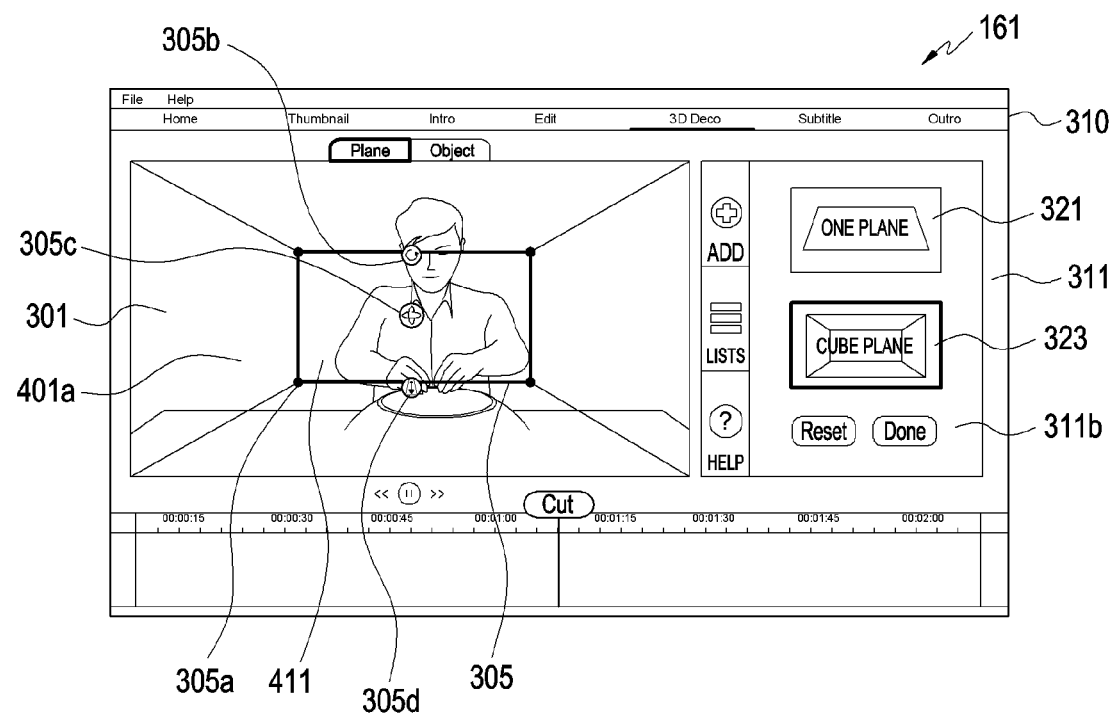
FIGS. 4A, 4B, 4C and 4D are diagrams of an example for image processing in an electronic device according to an embodiment.
Figure 4B:
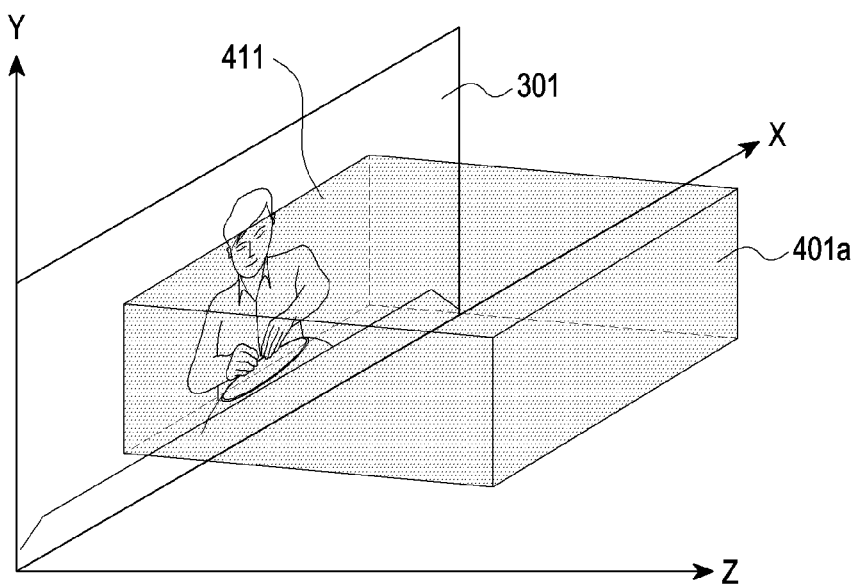

Referring to FIGS. 4A and 4B, according to an embodiment, the processor (e.g., the processor 120 of FIGS. 1 and 2) of the electronic device (e.g., the electronic device 101 of FIGS. 1 and 2) may control the display 161 to display an execution screen 311 for image processing and, in response to an image edit request, display a 2D (x, y) image (still image or frame) 301 corresponding to a reproduction time ($T_{cut0}$) 331 selected from obtained video data in a first area 311a of the execution screen 311. In response to selection of a second type (e.g., cube plane) 323 from among the virtual plane setting types on the execution screen 311, the processor 120 may set virtual planes, shaped as a cube 401a, in a virtual 3D (x, y, z) position, in a vertical direction, corresponding to the 2D first image 301 displayed on the first area 311a. The processor 120 may display a first control object 305 on the first area 311a to overlap at least part of the 2D first image 301. The first control object 305 may be set to have the same shape and size, corresponding to the center plane 411 among the virtual planes of the cube shape 401a. The first control object 305 may include at least one of a first element 305a (e.g., vertexes or guide line of the rectangular box) of the x- and y-axis movement for resizing the center plane 411 among the virtual planes, a second element 305b for rotation on the z axis for rotation, a third element 305c of left/right rotation on the y axis or upward/downward rotation on the x axis for rotation, or a fourth element 305d of movement on the z axis for depth adjustment. The first control object 305 may be automatically set and displayed as the menu displayed on the execution screen 311 is selected or at least one virtual plane is set. The first control object 305 may perform three-axis rotation or three-axis movement.

Figure 4C:
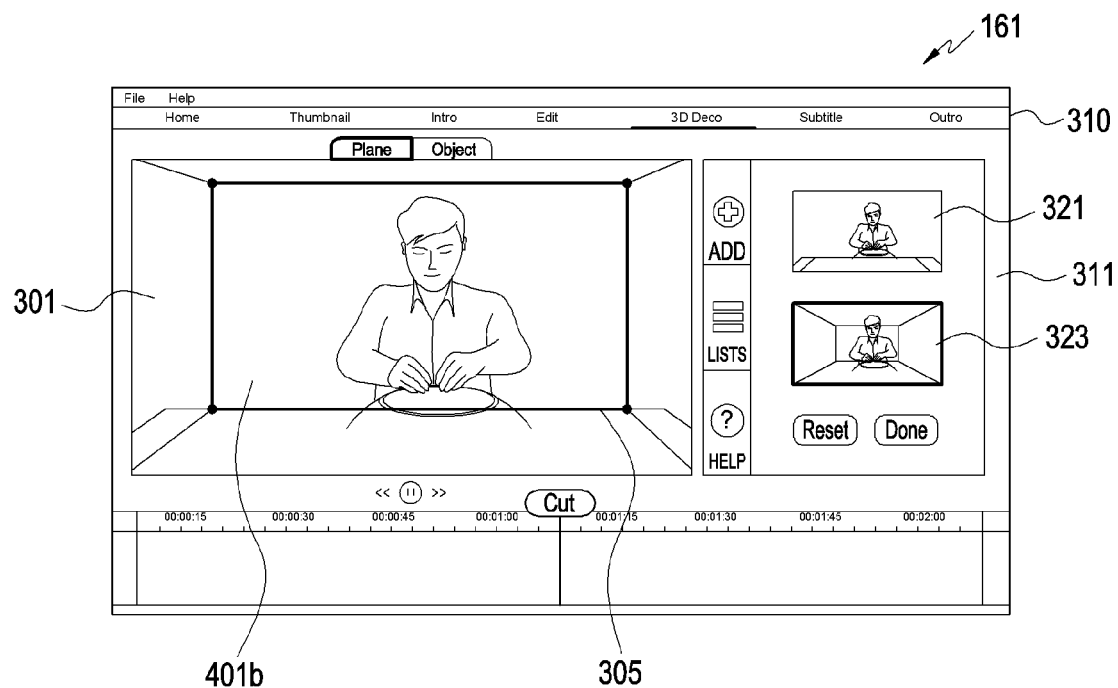
Figure 4D:
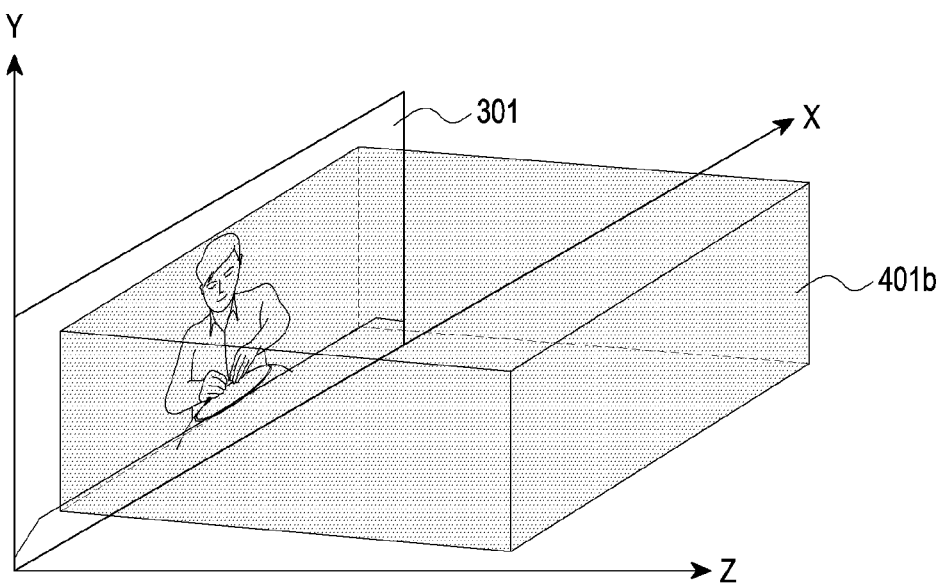

Referring to FIGS. 4C and 4D, the processor (e.g., the processor 120 of FIGS. 1 and 2) may change the virtual planes of the cube shape 401a, as shown in FIGS. 4A and 4B, by resizing the first control object 305. The processor 120 may resize the center plane 411 among the virtual planes by adjusting at least one of four vertexes of the first control object 305. As the center plane 411 is enlarged in the x-axis and y-axis directions with respect to the four vertexes of the first control object 305, the remaining virtual planes all are also resized as shown in FIG. 4C, so that the processor 120 may set virtual planes shaped as the changed cube 401b as shown in FIG. 4D.

Figure 5A:
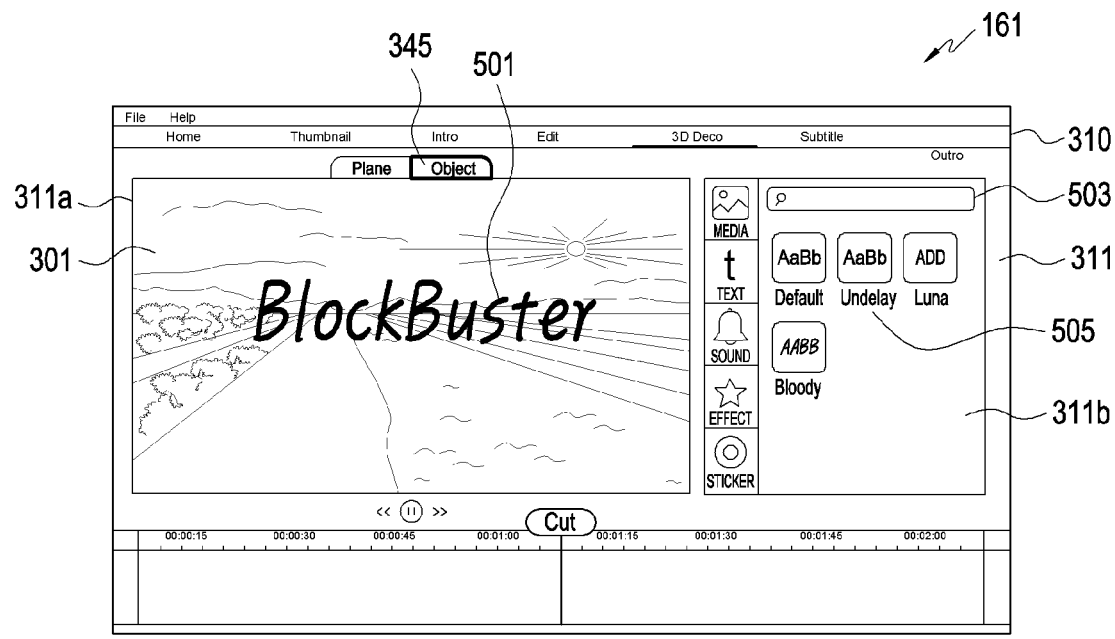

FIGS. 5A and 5B are diagrams of an example for image processing in an electronic device according to an embodiment.

Referring to FIG. 5A, according to an embodiment, the processor (e.g., the processor 120 of FIGS. 1 and 2) of the electronic device (e.g., the electronic device 101 of FIGS. 1 and 2) may identify that, among the functions of the application for image processing corresponding to the image processing module 210, e.g., the function corresponding to the 3D deco module is selected, and a menu (image, button, or object) 345 for indicating the operation for inputting or selecting a 3D object is selected. In this case, the processor 120 may control the display 161 to display information for selecting or inputting the 3D object in the second area 311*b* of the execution screen 311. The information for selection or input may include a menu for selecting the type of the 3D object, e.g., at least one of media, text, sound, effect, or sticker and may include a menu (image or object) 503 for inputting or searching for the 3D object or a menu (image, button, or object) 505 indicating the functions for changing the shape of the object, e.g., font. The second area 311*b* may be further set with various menus (images, buttons, or objects). If, e.g., a text-type 3D object (e.g., blockbuster) 501 is selected or input, the processor 120 may apply the 3D object 501 to the first image 301 displayed in the first area 311 by inserting the 3D object onto the set virtual plane to present a 3D effect as described in connection with FIGS. 3A to 3D.

Referring to FIG. 5B, according to an embodiment, the processor (e.g., the processor 120 of FIGS. 1 and 2) of the electronic device (e.g., the electronic device 101 of FIGS. 1 and 2) may set a 3D virtual space including the set virtual plane 303*b* and the 2D first image 301 as described in connection with FIG. 3C. The processor 120 may insert the selected or predetermined 3D object 511 or 521 onto the 3D virtual space. When inserting the 3D object 511 or 521 into the set virtual space, the processor 120 may insert the 3D object 511 or 521 based on one type selected from among set types of the 3D object. The types of the 3D object may include a first type (plane attach type) of attaching and inserting the 3D object 511 to the set plane to present a 3D visual effect and a second type (plane interaction type) 520 of inserting the 3D object 521 to present such a 3D visual effect as if the 3D object floats over the set plane in a direction perpendicular to the set plane. The first type 510 may be divided into a static type capable of setting a media (e.g., image or video) and 2D sticker (e.g., PNG image) object and a dynamic type (animated type) capable of setting a text and visual effect (VFX) (e.g., magic circle) object. The second type 520 may be divided into a static type capable of setting a text (e.g., shadowed text) object and a dynamic type (animated type) capable of setting a text (e.g., standing text), visual effect (VFX) (e.g., soap bubbles, fireworks, bouquet, or smoke), emotion sticker (emoticon) (e.g., joy, anger, annoyance, and cry), or 3D sticker (e.g., like or subscribe) object.

Figure 6A:
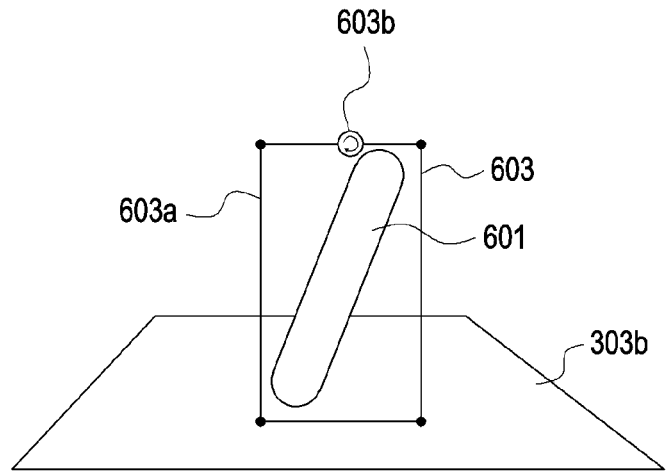
FIGS. 6A and 6B are diagrams of an example for image processing in an electronic device according to an embodiment.
Figure 6B:
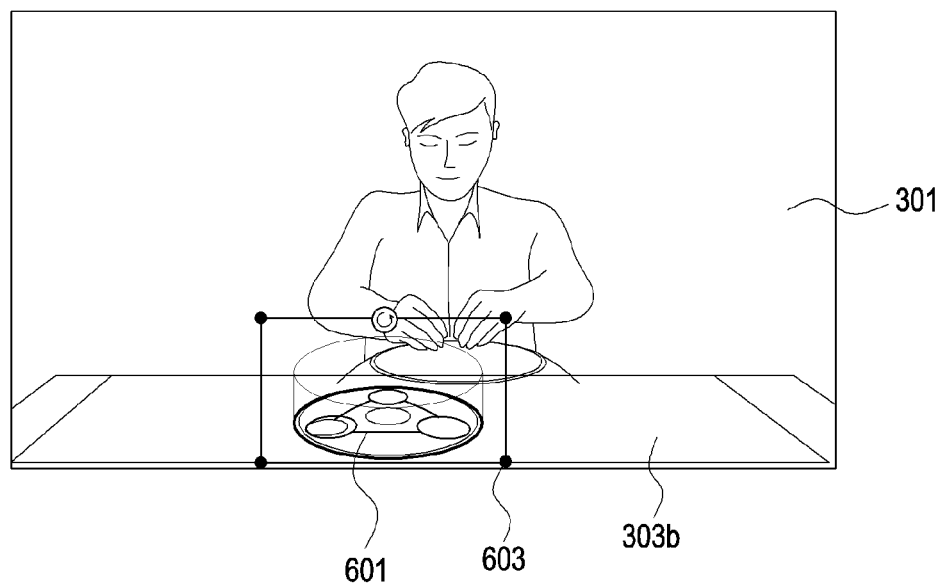

FIGS. 6A and 6B are diagrams of an example for image processing in an electronic device according to an embodiment.

Referring to FIGS. 6A and 6B, according to an embodiment, the processor (e.g., the processor 120 of FIGS. 1 and 2) of the electronic device (e.g., the electronic device 101 of FIGS. 1 and 2) may set a 3D virtual space including the set virtual plane 303*b* and the 2D first image 301 as described in connection with FIG. 3C. If the selected type of the 3D object is the first type, the processor 120 may insert the 3D object 601 onto the set virtual space by attaching the 3D object 601 to the set plane 303*b* to present a visual effect. The processor 120 may generate at least one 2D second image by synthesizing the 3D object 601, inserted based on the first type, and the 2D first image 301.

Referring back to FIGS. 6A and 6B, when inserting the 3D object 601, the processor 120 may control the display 161 to display a second control object 603 to adjust the size and direction of the 3D object 601. The second control object 603 may be displayed in response to a selection input of the 3D object 601 and be configured to be capable of one-axis rotation, two-axis movement, and scaling. The second control object 603 may include an element 603*a* (vertexes of the rectangular box or guide lines) for dependently moving on the virtual plane 303*b* and an element 603*b* for dependently rotating on the virtual plane 303*b*.

Figure 7A:
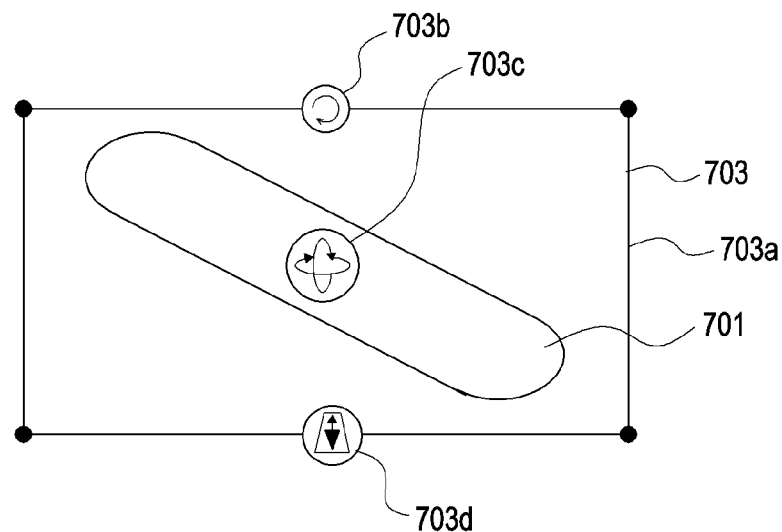
FIGS. 7A and 7B are diagrams of an example for image processing in an electronic device according to an embodiment.
Figure 7B:
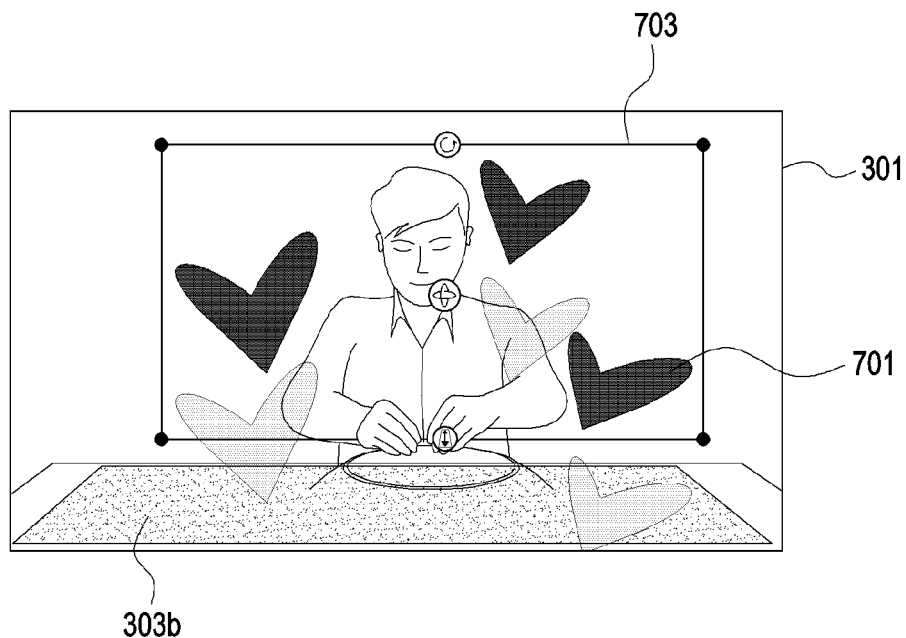

FIGS. 7A and 7B are diagrams of an example for image processing in an electronic device according to an embodiment.

Referring to FIGS. 7A and 7B, according to an embodiment, the processor (e.g., the processor 120 of FIGS. 1 and 2) of the electronic device (e.g., the electronic device 101 of FIGS. 1 and 2) may set a 3D virtual space including the set virtual plane 303*b* and the 2D first image 301 as described in connection with FIG. 3C. If the selected type of the 3D object 701 is the second type (plane interaction type), the processor 120 may insert the 3D object 701 to present such a 3D visual effect as if the 3D object 701 floats over the set plane 303*b* in the direction perpendicular to the set plane 303*b*. The processor 120 may generate a 2D second image by synthesizing the 3D object 701, inserted based on the second type, and the 2D first image 301.

Referring back to FIGS. 7A and 7B, the processor 120 may control the display 161 to display a third control object 703 to adjust the size, direction, and depth of the 3D object 701. The third control object 703 may be displayed in response to a selection input of the 3D object 701 and be configured to be capable of three-axis rotation, tree-axis movement, and scaling. The third control object 703 may include at least one of an element 703*a* (e.g., vertexes of the rectangular box or guide lines) for resizing (x-axis or y-axis movement) of the 3D object 701, an element 703*b* for rotation on the z axis of the 3D object 701, an element 703*c* for left/right rotation on the y axis or upward/downward rotation on the x axis of the 3D object 701, or an element 703*d* for movement on the z axis for depth adjustment.

Figure 8A:
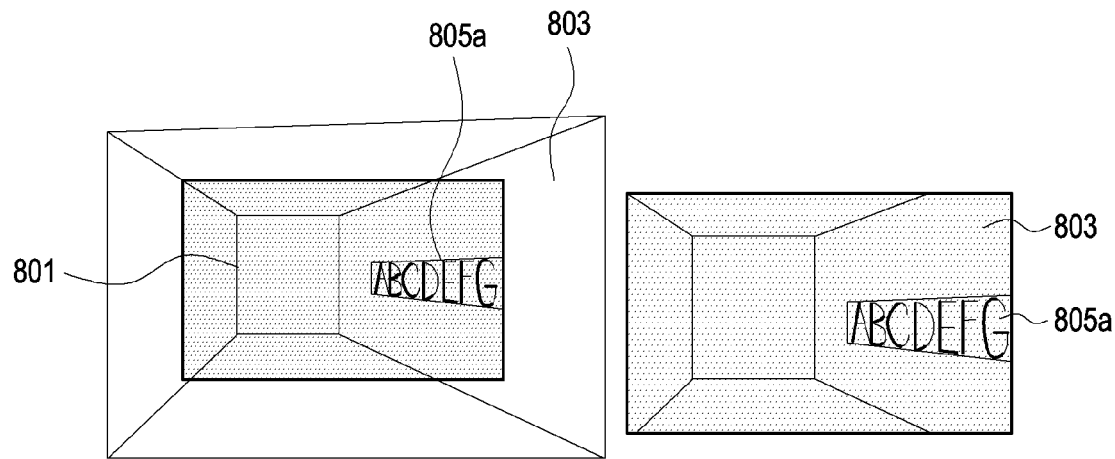
FIGS. 8A, 8B, and 8C are diagrams of an example for image processing in an electronic device according to an embodiment.
Figure 8B:
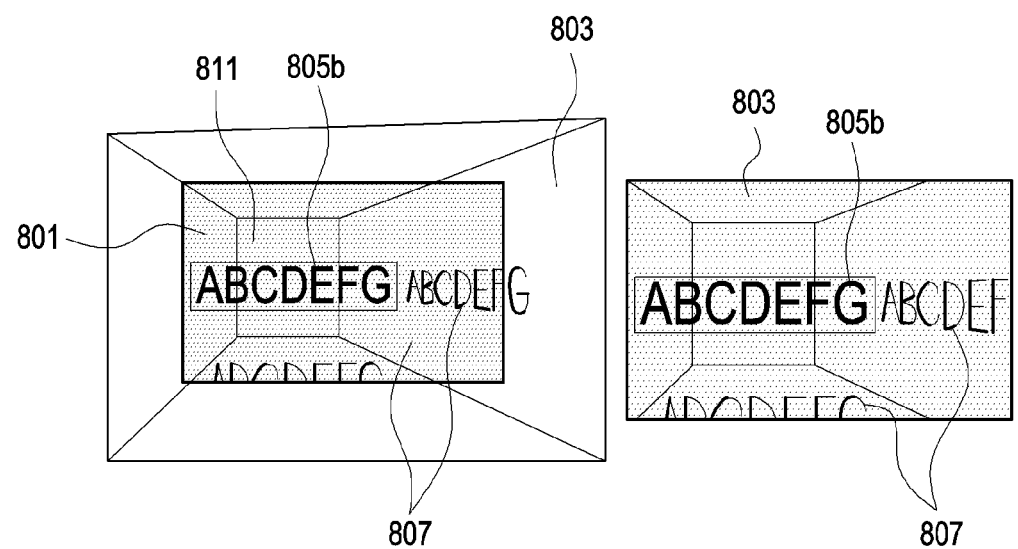
Figure 8C:
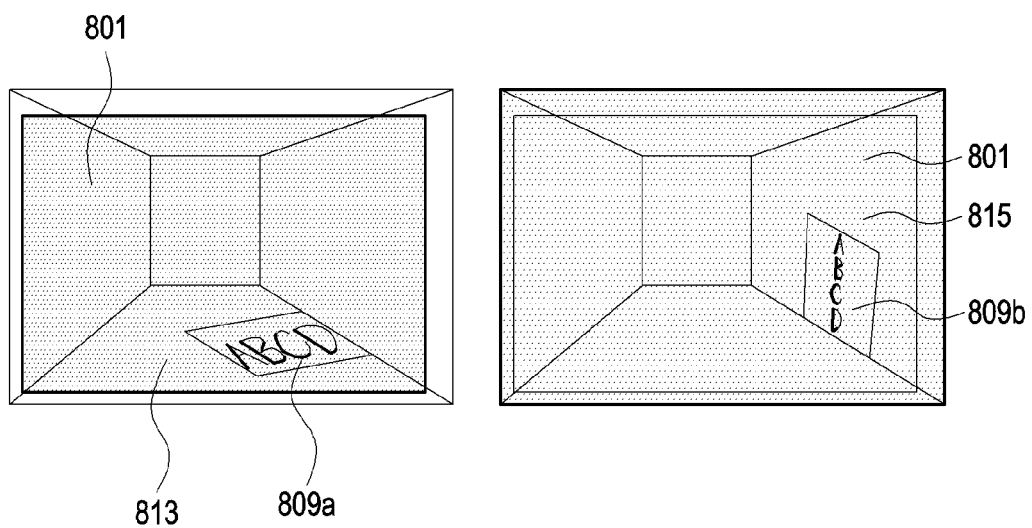

FIGS. 8A, 8B, and 8C are diagrams of an example for image processing in an electronic device according to an embodiment.

Referring to FIG. 8A, according to an embodiment, the processor (e.g., the processor 120 of FIGS. 1 and 2) of the electronic device (e.g., the electronic device 101 of FIGS. 1 and 2) may set a 3D virtual space 803 including virtual planes having a cube shape 401*b* and the 2D first image 301 as described in connection with FIG. 4C. The set 3D virtual space 803 may correspond to an inner space formed by the virtual planes of the cube shape 401*b*. The processor 120 may insert the selected or predetermined 3D object 805*a* onto the 3D virtual space. If the selected type of the 3D object 805*a* is the first type, the processor 120 may insert the 3D object 805*a* onto the 3D virtual space 803 by attaching the 3D object 805*a* to at least one of the virtual planes of the cube shape 401*b* to present a 3D visual effect. The processor 120 may generate a 2D second image by synthesizing the 3D object 805*a*, inserted based on the first type, and the 2D first image 801.

Referring to FIG. 8B, according to an embodiment, the processor (e.g., the processor 120 of FIGS. 1 and 2) of the electronic device (e.g., the electronic device 101 of FIGS. 1 and 2) may set a 3D virtual space 803 including virtual planes having a cube shape 401*b* and the 2D first image 801 as described in connection with FIG. 4C. The set 3D virtual space 803 may correspond to an inner space formed by the virtual planes of the cube shape 401*b*. The processor 120 may insert the selected or predetermined 3D object 805*b* onto the 3D virtual space 803. If the selected type of the 3D object is the second type, the processor 120 may insert the 3D object 805*b* to present such a 3D effect as if the 3D object 805*b* floats over the center virtual plane 811 among the virtual planes of the cube shape 401*b*. The processor 120 may set a 3D visual effect (e.g., shadow) 807 to the inserted 3D object 805b. The processor 120 may generate a 2D second image by synthesizing the 3D object 805b, inserted based on the second type, and the 2D first image 801.

Referring to FIG. 8C, according to an embodiment, the processor 120 of the electronic device 101 may set a 3D virtual space 803a including the set cube shape (e.g., the virtual planes of 401b of FIG. 4C) and the 2D first image 801. The set 3D virtual space 803 may correspond to an inner space formed by the virtual planes of the cube shape (e.g., 401b of FIG. 4C). The processor 120 may insert the selected or predetermined 3D object 809a onto the 3D virtual space 803. For example, the processor 120 may insert the 3D object 809a to present such a 3D visual effect as if the 3D object 801 is attached to one plane 813 among the virtual planes of the 3D object 801 in the 3D virtual space 803. The processor 120 may set a 3D object insertion condition to present such a visual effect as if the 3D object 809a is moved only inside the 3D virtual space 803 and, if the 3D object 809a moves and reaches the boundary between the virtual planes, insert a 3D object 809b set by rotating the 3D object 809a without continuously moving the 3D object 809a in the extending direction on the displayed virtual plane 813, onto the virtual plane set toward the moving direction, e.g., the virtual plane 815 on the left side of the virtual plane 803.

The operation procedure in the above-described electronic device (e.g., the first electronic device 101 of FIGS. 1 and 2) is described below in detail with reference to the accompanying drawings.

Figure 9:
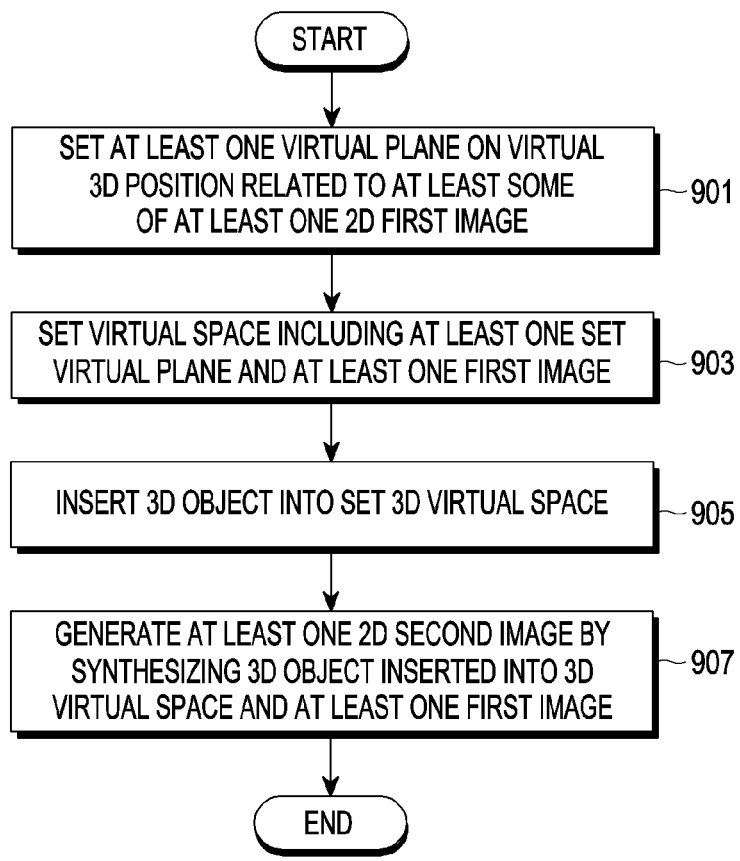
FIG. 9 is a diagram of an example of an operation procedure of an electronic device according to an embodiment.

FIG. 9 is a diagram of an example of an operation procedure of an electronic device according to an embodiment.

Referring to FIG. 9, in operation 901, according to an embodiment, the electronic device (e.g., the first electronic device 101 of FIGS. 1 and 2) may set at least one virtual plane in a virtual 3D virtual position related to at least a portion of at least one 2D first image displayed on the display (e.g., the display device of FIG. 1 and the display 161 of FIG. 2). The electronic device may display the at least one 2D first image along with menus for image processing, on an edit execution screen of an image edit application. The at least one 2D first image may be at least some frames included in a video or at least one still image. The electronic device may set a virtual plane in a 3D virtual position parallel with the image displayed on the edit execution screen, identify the position of the first image displayed on the display, projected to the set virtual plane, and display, on the display, a first control object for controlling the virtual plane by interacting with the virtual plane set in the identified position of the first image. The identified position of the first image may be a position corresponding to the coordinate value (e.g., the 2D coordinate value (x, y)) of the first image displayed on the display. The electronic device may adjust at least one of the size, movement, or rotation of the set virtual plane using the first control object. The electronic device may display the first control object to correspond to the display area where the 3D object is to be inserted, by adjusting the first control object. The electronic device may identify the 3D virtual position back-projected to the virtual plane interacting according to the adjustment of the first control object and set the virtual plane in the identified 3D virtual position.

In operation 903, the electronic device may set a virtual space including the at least one set virtual plane and the at least one first image.

In operation 905, the electronic device may insert the 3D object to the set 3D virtual space. The electronic device may select a type for adding a 3D object and insert a predetermined or selected 3D object to the virtual space based on the selected type.

If the first type (plane attached type) is selected from among the 3D object types, the electronic device may set a 3D virtual position (x, y, z) where at least a portion of the 3D object is attached to the at least one virtual plane in the virtual space and add the 3D object in the set virtual position. The electronic device may display, on the edit execution screen, a second control object for adjusting the size or direction of the inserted 3D object. The second control object may be displayed overlaid on at least one first image displayed in the 2D position (x, y) of the display corresponding to the 3D virtual position where the 3D object is inserted. The electronic device may change at least one of the size, shape, or position of the inserted 3D object by moving or rotating the 3D object or resizing the 3D object by adjusting the second control object. The second control object may be rotated or moved on the virtual plane dependently on the virtual plane.

In operation 907, the electronic device may generate at least one 2D second image by synthesizing the 3D object inserted into the 3D virtual space and the at least one first image. The electronic device may generate at least one 2D second image by rendering a 3D visual effect (e.g., at least one of movement, light, shadow, or animation) for the 3D object to interact with the image and the virtual plane on the set virtual space. The electronic device may map the at least one first image with the at least one second image or replace the at least one first image with the at least one second image and store in the memory.

Figure 10:
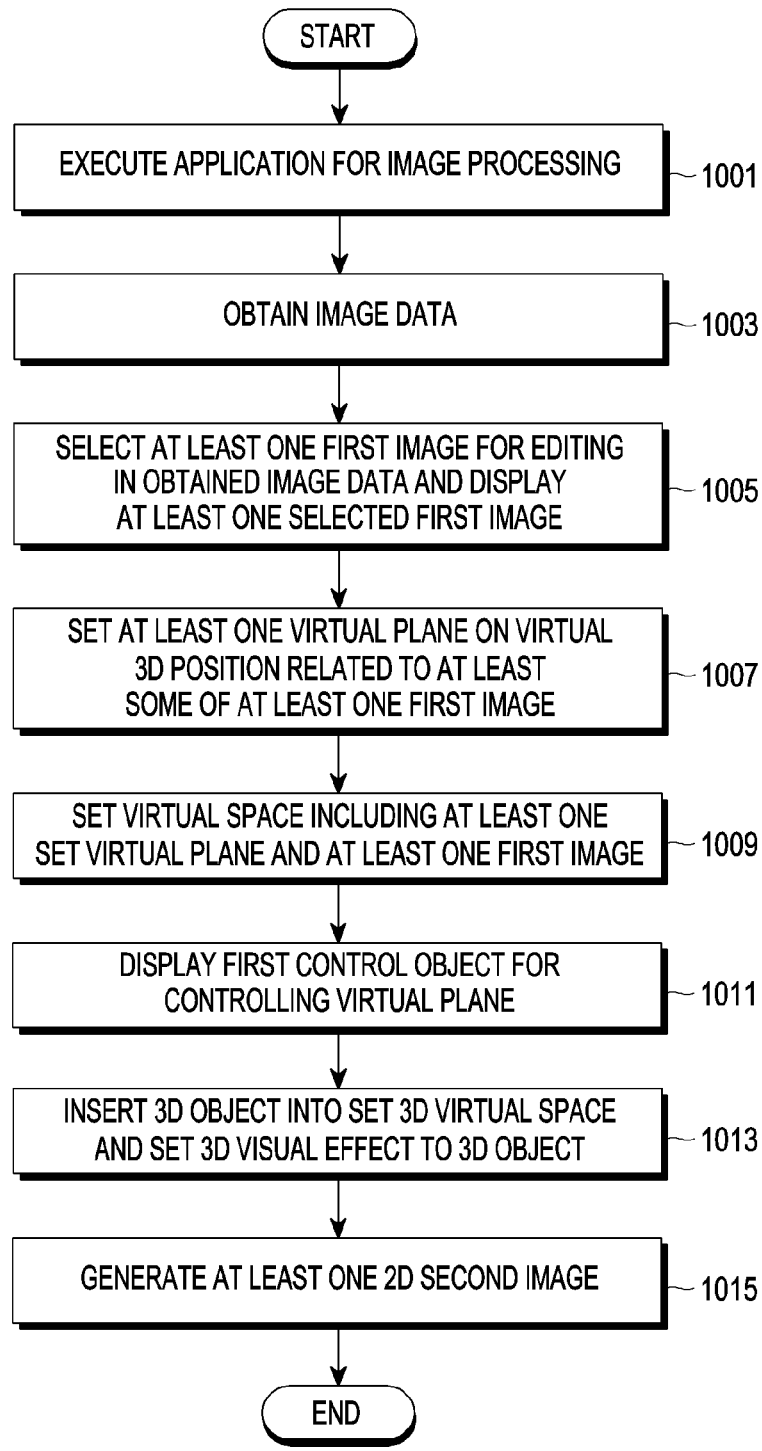
FIG. 10 is a diagram of an example of an operation procedure of an electronic device according to an embodiment.

FIG. 10 is a diagram of an example of an operation procedure of an electronic device according to an embodiment. FIGS. 11A, 11B, 11C, 11D and 11E are diagrams of an example of a screen for image processing in an electronic device according to an embodiment.

Figure 11A:
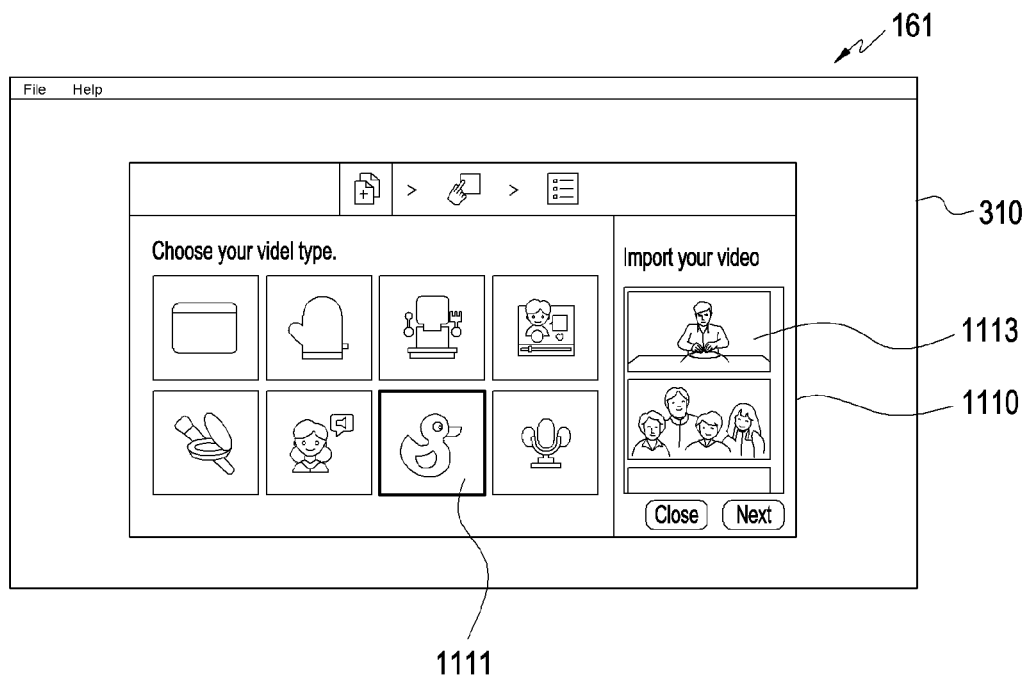
FIGS. 11A, 11B, 11C, 11D and 11E are diagrams of an example of a screen for image processing in an electronic device according to an embodiment.

Referring to FIGS. 10 and 11A, according to an embodiment, in operation 1001, the electronic device (e.g., the first electronic device 101 of FIGS. 1 and 2) may execute an application (program or function) 310 for image processing and display execution screens of the application 310 for image processing on the display 161 (e.g., the display device of FIG. 1 and the display 161 of FIG. 2). The application 310 for image processing may be an all-in-one application capable of performing all of, e.g., video reproduction, image (or video) creation, and image processing or an individual application for image (or video) creation or image processing. As shown in FIG. 11A, the electronic device may display a first execution screen 1110 (e.g., a home screen) of the executed application and display menus 1111 for selecting at least one multimedia content on the first execution screen 1110. The menus 1111 are menus in which multimedia content is divided per theme (or genre). Some images 1113 of at least one multimedia content corresponding to the menu selected from among the menus 1111 may be displayed in a partial area of the first execution screen.

Figure 11B:
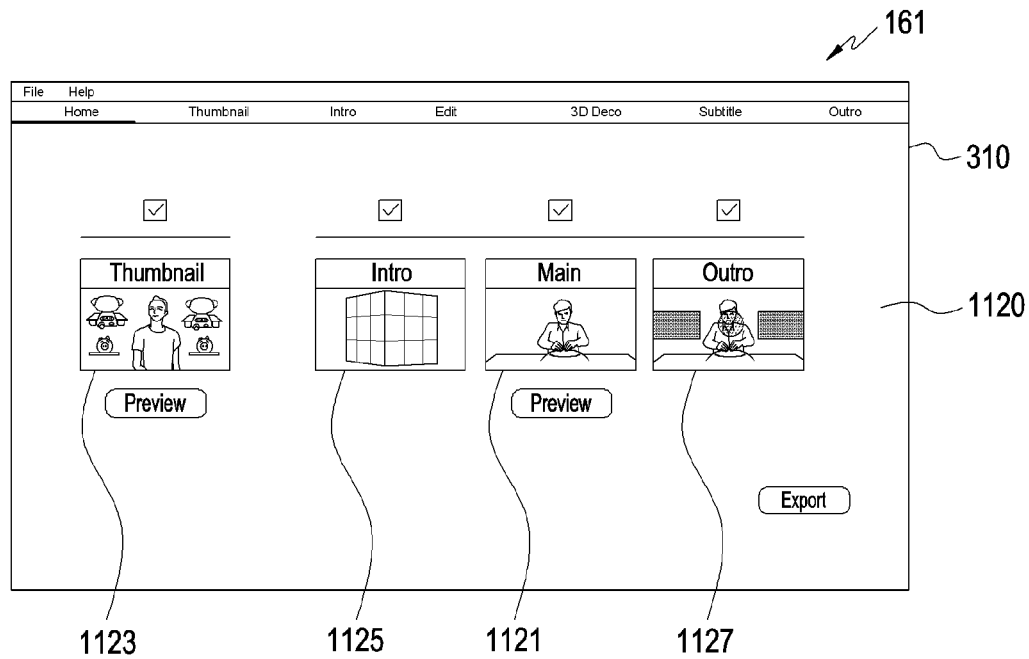

In operation 1003, the electronic device may obtain image data for processing. According to an embodiment, as shown in FIG. 11B, in response to selection of one from among the menus 1011 displayed on the first execution screen, the electronic device may obtain image data of at least one multimedia content corresponding to the selected menu. As shown in FIG. 11B, the electronic device may select specific images (e.g., a main image 1121 of the multimedia content, a thumbnail image 1123, an intro image 1125, and an outro image 1127) from the obtained image data and display the selected specific images on a second execution screen (e.g., home) 1120 of the application 310. The electronic device may display, on the first execution screen 1110, menus (or object) for checking whether each of the selected specific images 1121, 1123, 1125, and 1127 is edited. According to an embodiment, the electronic device may perform an image edit operation on each of the main image 1121, the thumbnail image 1123, the intro image 1125, and the outro image 1127. According to another embodiment, the electronic device may apply the second images generated according to image processing on the main image 1121 to at least one of the thumbnail image 1123, the intro image 1125, or the outro image 1127.

In operation 1005, in response to an edit request, the electronic device may select at least one first image for processing from the obtained image data and display the at least one selected first image on a third execution screen (e.g., 3D deco) 1030 which is an edit execution screen. As shown in FIG. 10C, the electronic device may display, on the third execution screen (e.g., 3D deco) 1030 of the application 310, a first image 1121 for image processing (e.g., main image), the virtual plane types 1131 and 1133, and an object (e.g., a timeline or time ruler) 1150 related to the reproduction time of the video including the first image 1121. The first image 1121 may be an image corresponding to a first time point 1151 selected in the reproduction time.

In operation 1007, the electronic device may set at least one virtual plane in a virtual 3D position, corresponding to at least a portion of at least one selected first image. If one of the virtual plane types 1131 and 1133 is selected on the third execution screen 1130 as shown in FIG. 11C, the electronic device may set at least one virtual plane in the virtual 3D position corresponding to at least part of the first image 1121.

Figure 11C:
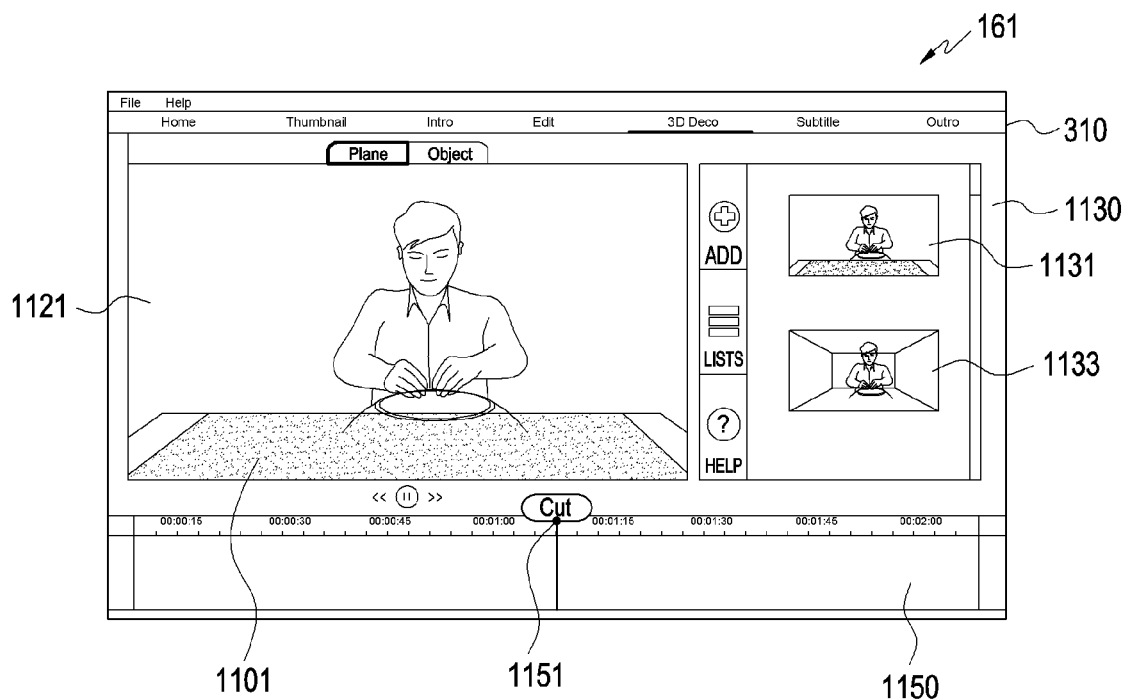

Referring to FIG. 11C, according to an embodiment, if the first type 1131 is selected from among the virtual plane types 1131 and 1133, the electronic device may set one virtual plane on a 3D virtual position parallel with the first image 1121 based on the virtual plane type (e.g., one plane) corresponding to the first type 1131. In response to selection of the first type 1131, the electronic device may identify the display position of the first image 1121 projected to the set virtual plane on a partial display area of the first image 1121 and display a rectangular FIG. 1101 corresponding to the virtual plane to facilitate the user's identification in the identified display position of the first image 1121. For example, the rectangular FIG. 1101 may be displayed to be distinguished from the first image 1121 using a difference in color or brightness. The identified display position of the first image 1121 may be a position corresponding to the coordinate value (e.g., the 2D coordinate value (x, y)) of the first image 1121 displayed on the display 161.

Referring back to FIG. 11C, according to an embodiment, if the second type 1133 is selected from among the virtual plane types 1131 and 1133, the electronic device may set a plurality of virtual planes having a designated cube shape on a 3D virtual position parallel corresponding to the first image 1121 based on the virtual plane type (e.g., cube plane) corresponding to the second type 1133. In response to selection of the second type 1133, the electronic device may identify the display position of the first image 1121 projected to the set virtual planes on the display area of the first image 1121 and display a cube figure corresponding to the virtual planes to facilitate the user's identification in the identified display position of the first image 1121. For example, the cube figure may be displayed to be distinguished from the first image 1121 using a difference in color or brightness. The identified display position of the first image 1121 may be a position corresponding to the coordinate value (e.g., the 2D coordinate value (x, y)) of the first image 1121 displayed on the display 161.

In operation 1009, the electronic device may set a 3D virtual space including the at least one set virtual plane (e.g., one plane or a plurality of virtual planes having a cube shape) and the first image 1121. For example, the 3D virtual space may be a space set by vertically extending from the 2D position (x, y) where the set virtual plane, i.e., the rectangular FIG. 1101, is displayed to the 3D virtual position. As another example, the 3D virtual space may be a space in a cube formed by a plurality of set virtual planes.

Figure 11D:
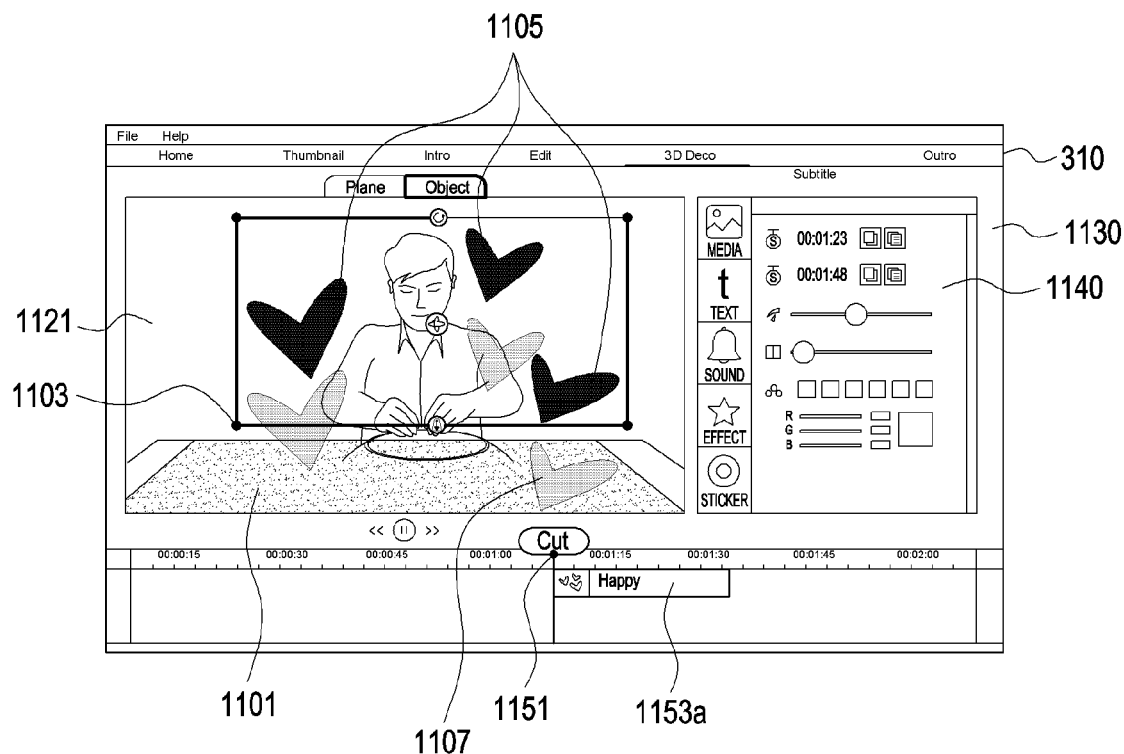
Figure 11E:
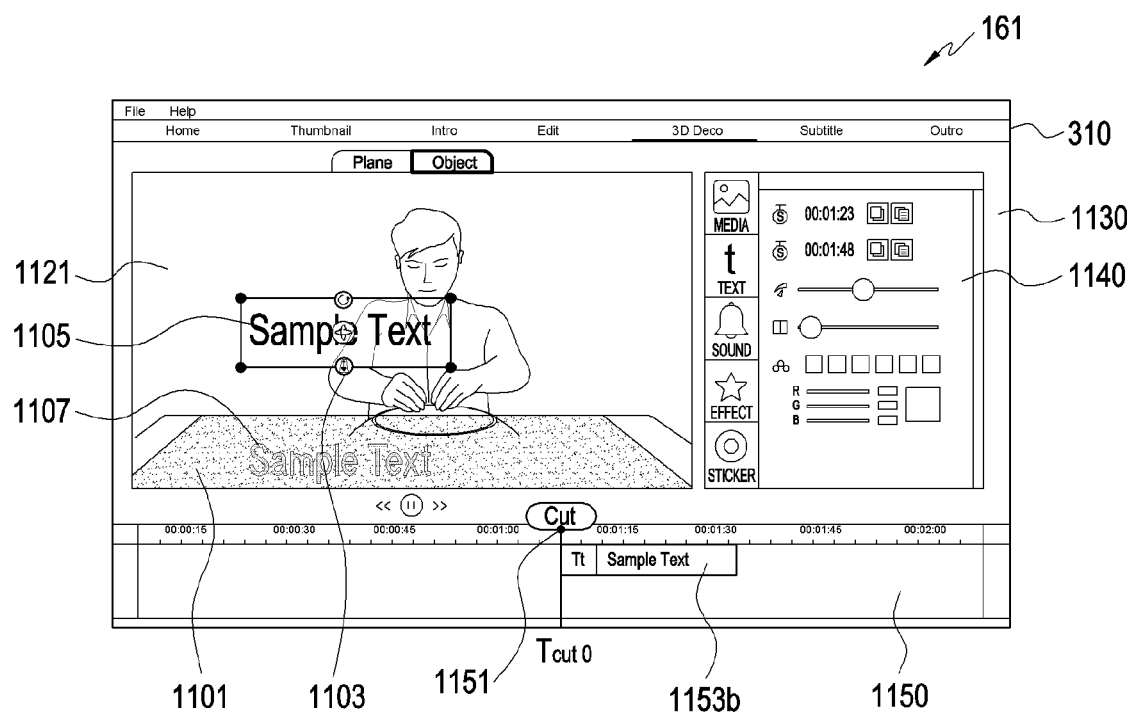

In operation 1011, the electronic device may display a first control object 1103 for controlling the virtual plane in the identified 2D position based on the virtual plane type 1131 or 1133 selected from the third execution screen 1130 as shown in FIGS. 11D and 11E. The first control object 1103 may be displayed to correspond to or match the rectangular FIG. 1101 and be displayed overlaid on a partial area of the first image 1121. The electronic device may display, on the third execution screen 1130, a user interface (screen, popup window, or layer) 1140 including menus for setting a 3D visual effect 1107 of the 3D object 1105 or configuring the 3D object 1105 to be inserted to the set virtual space.

In operation 1013, as shown in FIGS. 11D and 11E, the electronic device may insert the 3D object 1105 to the set virtual space based on the virtual plane type 1131 or 1133 selected from the third execution screen 1130 and set a 3D visual effect 1107 to the 3D object 1105. Referring to FIGS. 11D and 11E, the electronic device may insert the configured or input 3D object 1105 into the set virtual space using the menus included in the user interface 1140 and set a 3D visual effect (e.g., a shadow corresponding to the 3D object) 1107.

In operation 1015, the electronic device may generate at least one 2D second image by synthesizing the 3D object 1105, set with the 3D visual effect 1107, to the first image 1121. The electronic device may apply the generated 2D second image to the image data, map it with time information about the reproduction time $(T_{cut0})$ 1151 of the first image 1121, and store the generated second image. The electronic device may map or replace the first image 1121 selected from the image data, with the at least one second image and store it. As shown in FIGS. 11D and 11E, the electronic device may display the image (e.g., a small image, an icon, an emoticon, a button, or a graphic element) corresponding to the second image together, in the area displaying the reproduction time $(T_{cut0})$ 1151.

FIGS. 12A, 12B, 12C, 12D and 12E are diagrams of an example of a screen for image processing in an electronic device according to an embodiment.

Figure 12A:
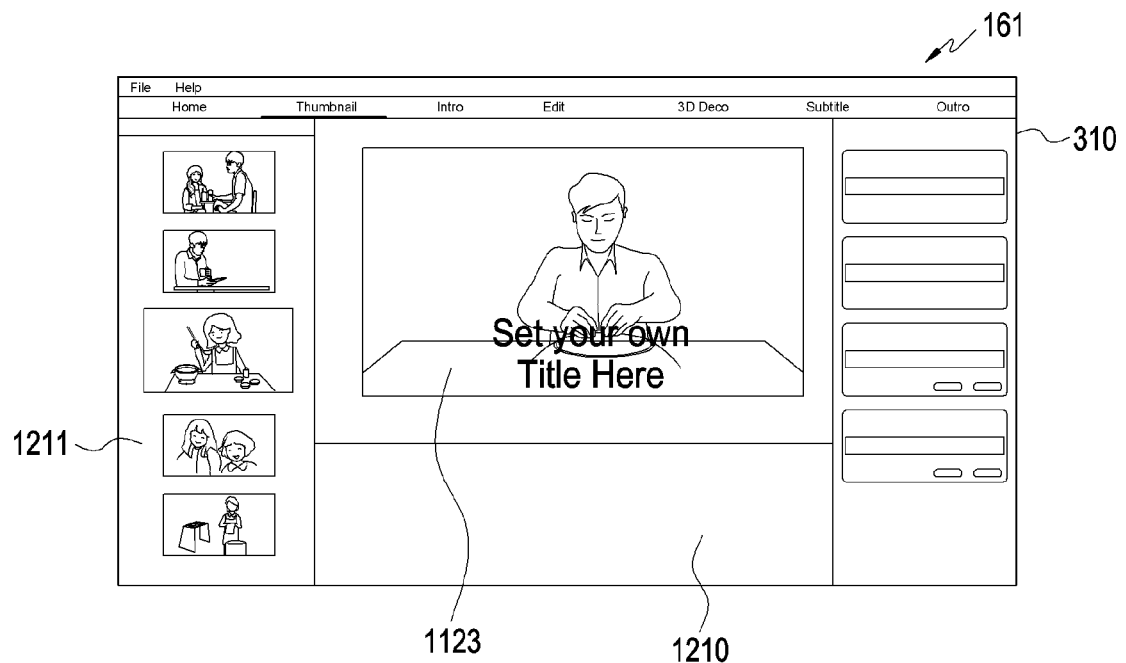
FIGS. 12A, 12B, 12C, 12D and 12E are diagrams of an example of a screen for image processing in an electronic device according to an embodiment.
Figure 12B:
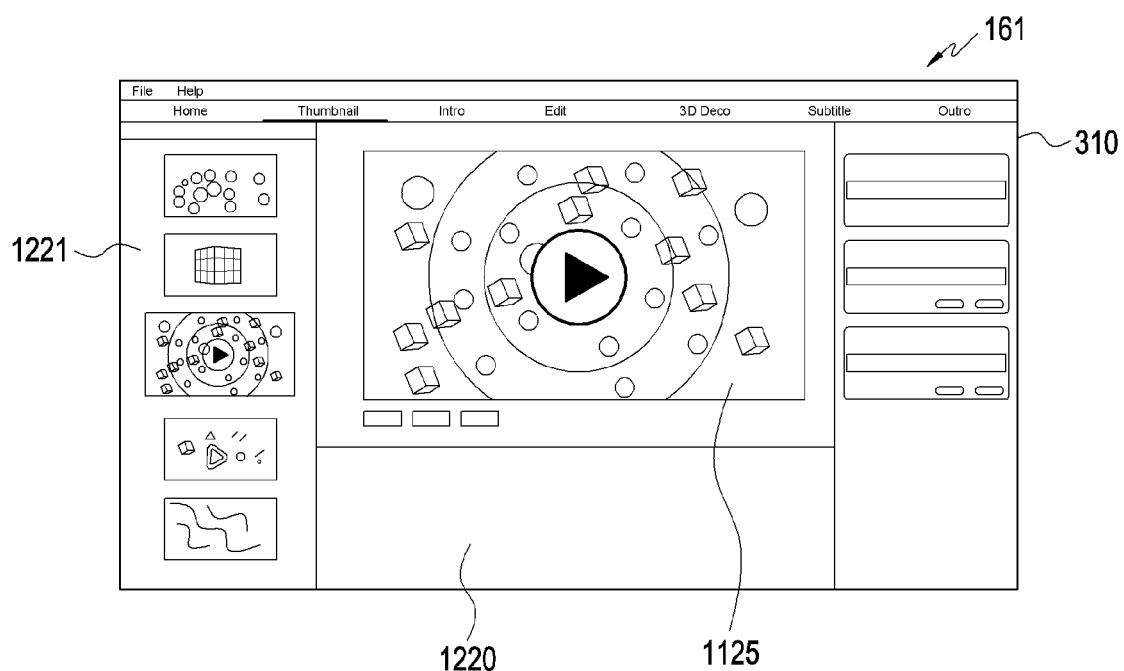
Figure 12C:
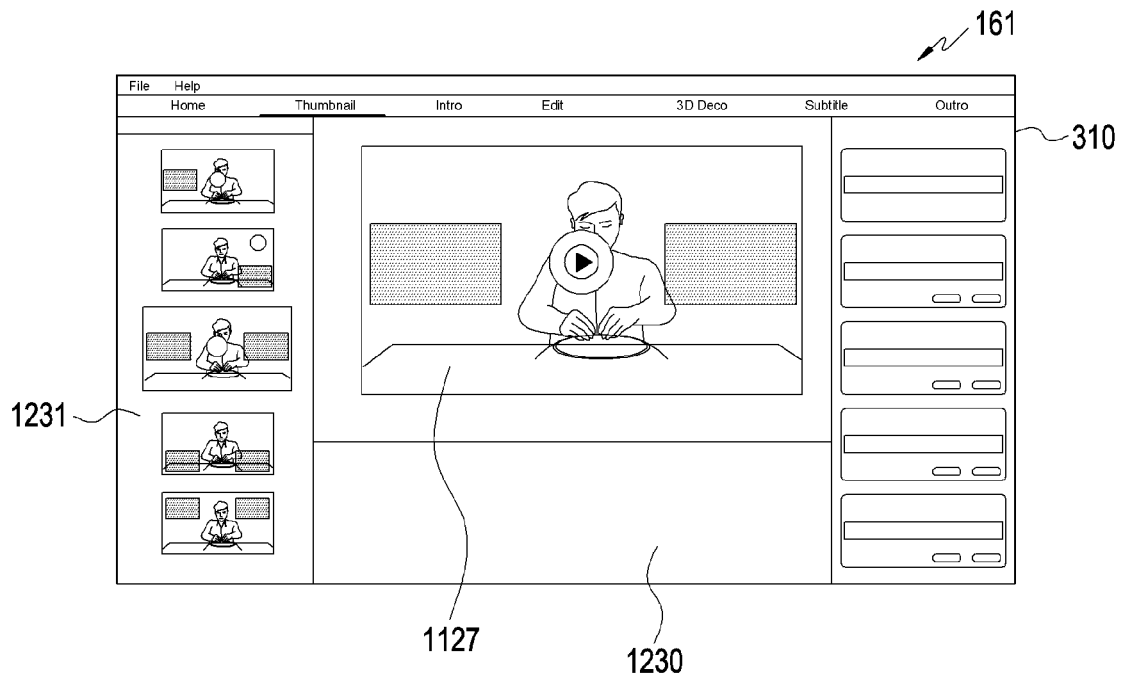

Referring to FIGS. 12A to 12C, according to an embodiment, the electronic device (e.g., the first electronic device 101 of FIGS. 1 and 2) may further selected an additional image (e.g., at least one of the thumbnail image 1123, the intro image 1125, or the outro image 1127) from among the specific images (e.g., the main image 1121 of the multimedia content, thumbnail image 1123, intro image 1125, and outro image 1127) displayed on the second execution screen 1120 of the application 310 as shown in FIG. 11B. As described in connection with FIGS. 11C to 11E, the electronic device may generate a second image corresponding to the additionally selected image (e.g., at least one of the thumbnail image 1123, intro image 1125, or outro image 1127) by applying the same edit procedure as the first image 1121 (e.g., the main image).

Referring to FIG. 12A, the electronic device may display the thumbnail image 1123 (e.g., the thumbnail image 1123 of FIG. 11B) on a fourth execution screen (e.g., a thumbnail execution screen) 1210 of the application 310 by execution of the thumbnail module and display some images of the image data, as thumbnail candidate images 1211 to be applied to the thumbnail image 1123, on the fourth execution screen 1210. The electronic device may apply an image selected from among the thumbnail candidate images 1211 to the thumbnail image 1123 and, in response to an edit request for the thumbnail image 1123, display the third execution screen (e.g., the third execution screen 1130 of FIGS. 11C to 11E), which is the edit execution screen, and display the thumbnail image 1123 on the third execution screen. The electronic device may perform processing on the thumbnail image 1123 in the same method as the edit operations described in connection with FIGS. 10 and 11C to 11E, generating a second image corresponding to the thumbnail image 1123.

Referring to FIG. 12B, the electronic device may display the intro image 1125 (e.g., the intro image 1125 of FIG. 11B) on a fifth execution screen (e.g., the intro execution screen) 1220 of the application 310 by execution of the intro module and display, on the fifth execution screen 1220, at least one intro candidate image 1221 (e.g., at least one of part of the image data, downloaded images, captured images, or created images) to be applied to the intro image 1125. The electronic device may apply an image selected from among the at least one intro candidate image 1221 to the intro image 1125 and, in response to an edit request for the intro image 1125, display the third execution screen (e.g., the third execution screen 1130 of FIGS. 11C to 11E), which is the edit execution screen, and display the intro image 1125 on the third execution screen. The electronic device may perform processing on the intro image 1125 in the same method as the edit operations described in connection with FIGS. 10 and 11C to 11E, generating a second image corresponding to the intro image 1125.

Referring to FIG. 12C, the electronic device may display the outro image 1127 (e.g., the outro image 1127 of FIG. 11B) on a sixth execution screen (e.g., the outro execution screen) 1230 of the application 310 by execution of the outro module and display, on the sixth execution screen 1230, at least one outro candidate image 1231 (e.g., part of the image data) to be applied to the outro image 1127. The electronic device may apply an image selected from among the at least one outro candidate image 1231 to the outro image 1127 and, in response to an edit request for the outro image 1127, display the third execution screen (e.g., the third execution screen 1130 of FIGS. 11C to 11E), which is the edit execution screen, and display the outro image 1127 on the third execution screen. The electronic device may perform processing on the outro image 1127 in the same method as the edit operations described in connection with FIGS. 10 and 11C to 11E, generating a second image corresponding to the outro image 1127.

Figure 12D:
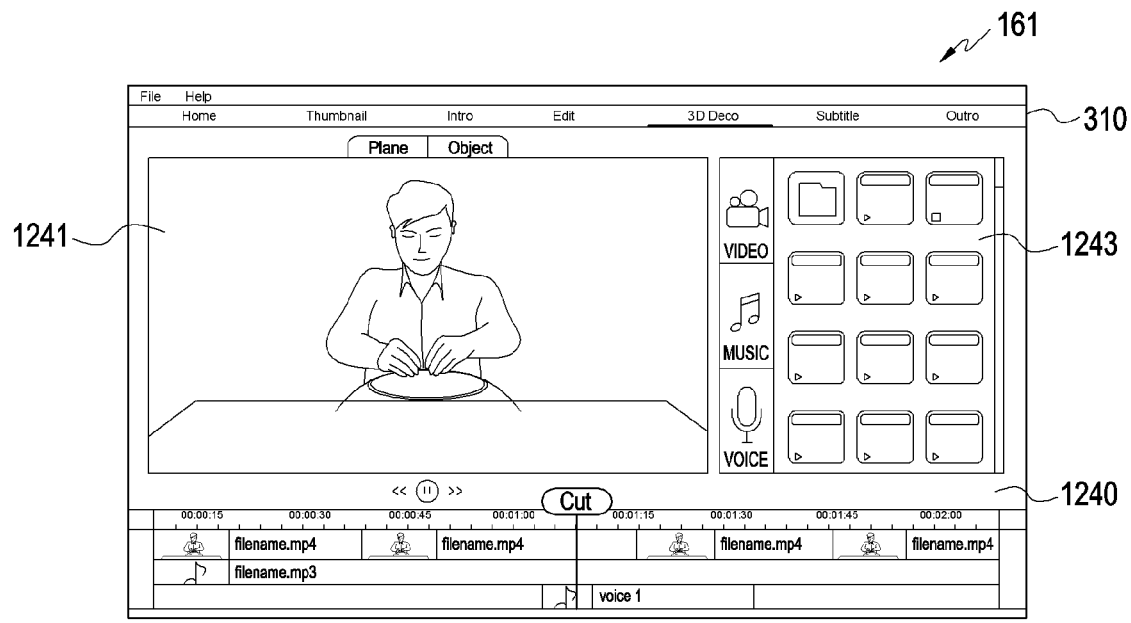

Referring to FIG. 12D, according to an embodiment, the electronic device (e.g., the first electronic device 101 of FIGS. 1 and 2) may select at least one first image 1241 for processing from the image data and display a seventh execution screen 1240 of the application 310 which is an execution screen for applying music or input voice (or sound) 1243 to the image. The electronic device may display the at least one selected first image 1241 on the third execution screen (e.g., the third execution screen 1130 of FIGS. 11C to 11E) which is the edit execution screen of the application 310. The at least one selected first image 1241 may be an image corresponding to the image 1121 displayed on the third execution screen described in connection with FIG. 11C. According to an embodiment, the electronic device may load at least one generated second image on the third execution screen corresponding to the at least one selected first image 1241 and apply the music or input voice (or sound) 1243 to the at least one second image.

Figure 12E:
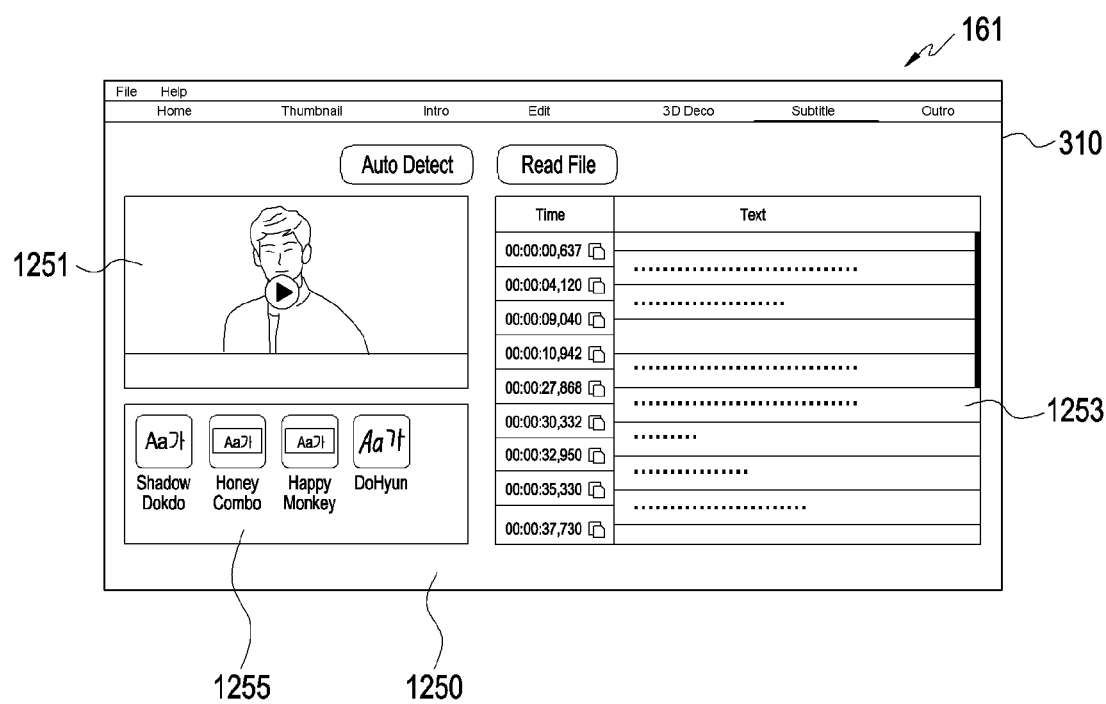

Referring to FIG. 12E, according to an embodiment, the electronic device (e.g., the first electronic device 101 of FIGS. 1 and 2) may display an eighth execution screen 1250 for generating a caption in the image data. The electronic device may display, on the eighth execution screen 1250, the selected image 1251, menus 1253 for inputting text, and a menu for editing text (at least one of font, size, thickness, letter color, shading, superscript, subscript, tilt, rotate, style, or other edit functions) for generating a caption in the image data.

Figure 13A:
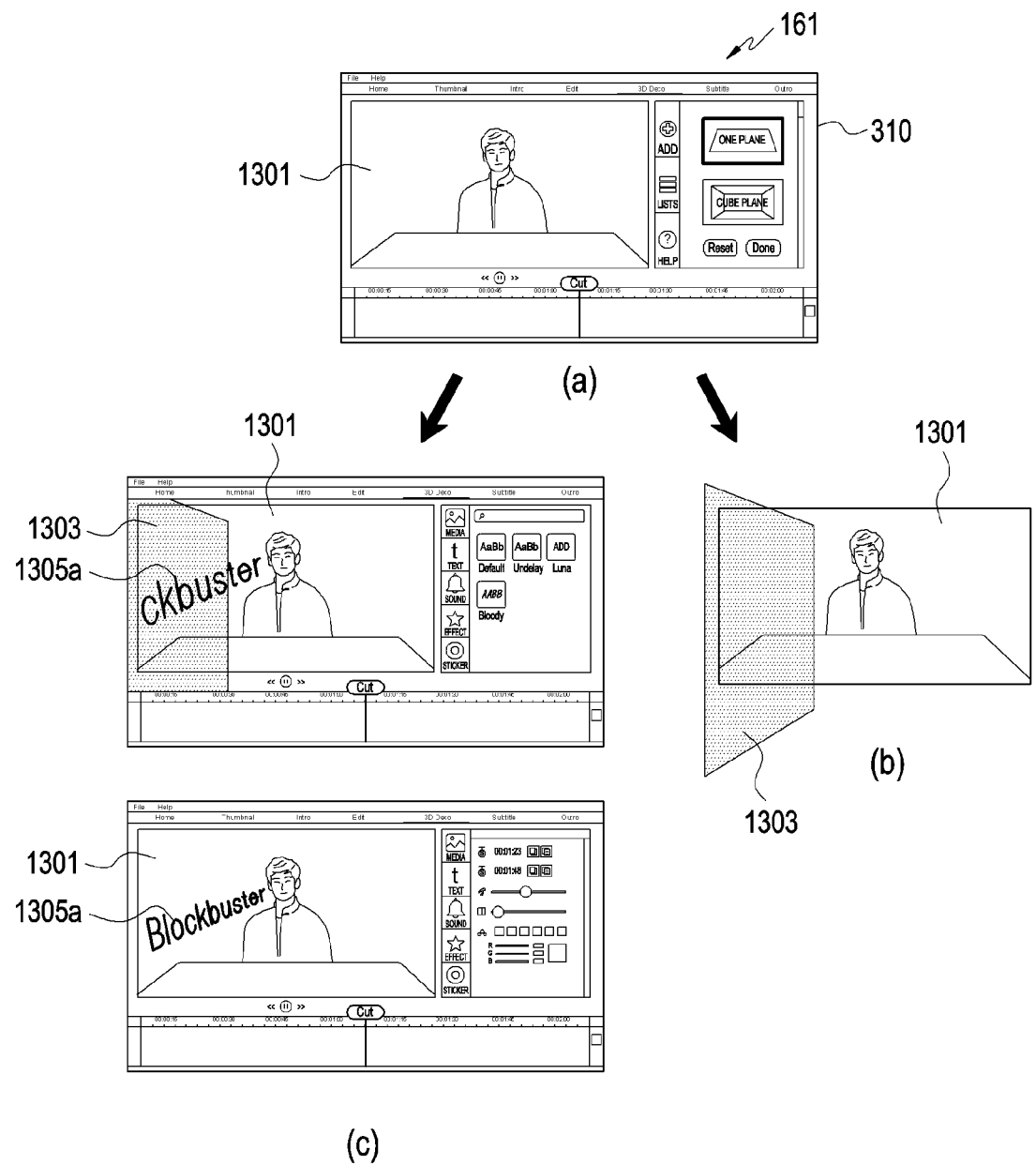
FIGS. 13A and 13B are diagrams of an example of a screen for image processing in an electronic device according to an embodiment.
Figure 13B:
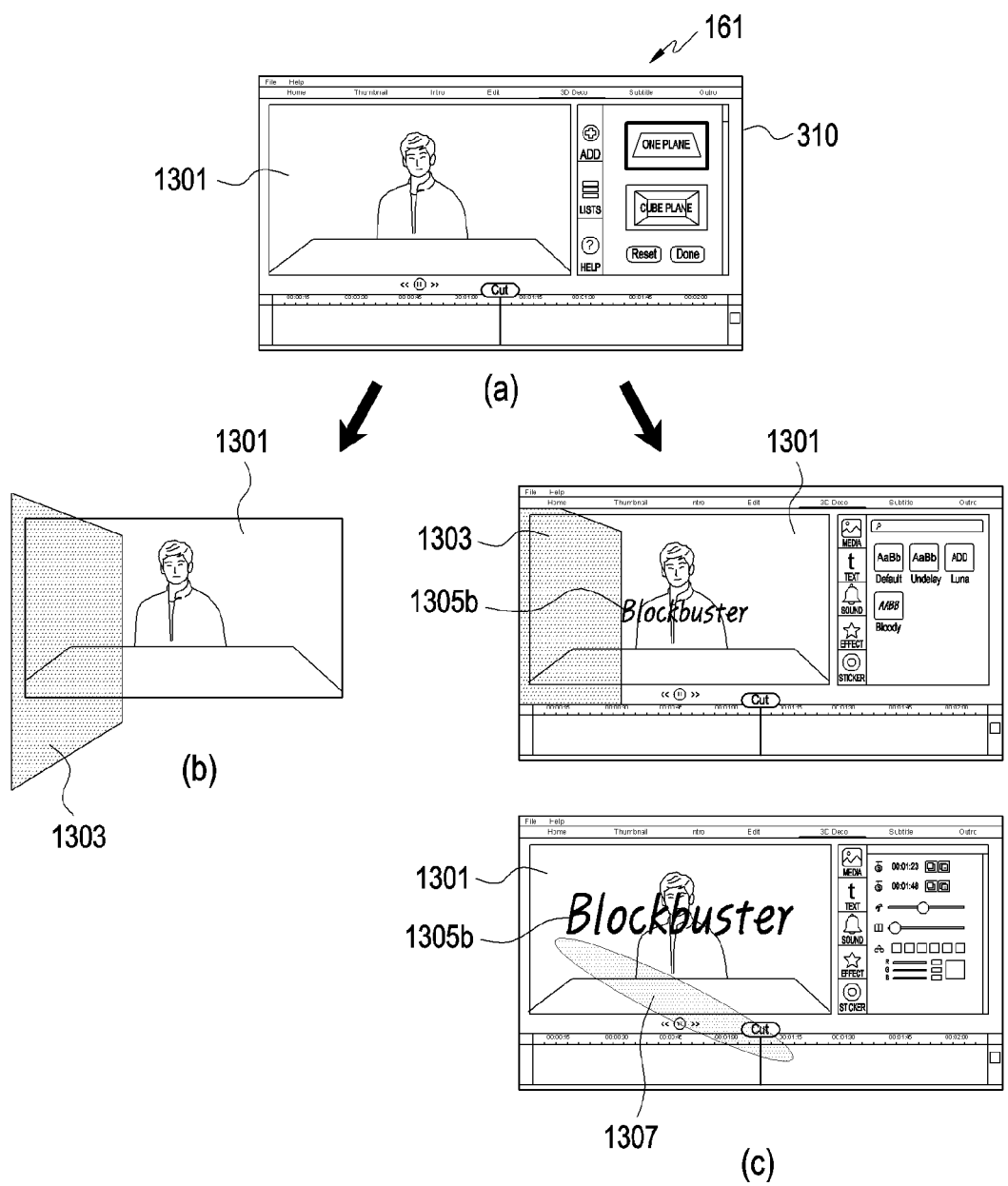

FIGS. 13A and 13B are diagrams of an example of a screen for image processing in an electronic device according to an embodiment.

Referring to FIGS. 13A and 13B, according to an embodiment, the electronic device (e.g., the first electronic device 101 of FIGS. 1 and 2) may display a first image 1301 for processing and set an additional virtual plane 1303 (hereinafter, referred to as a second virtual plane) in the same operations as the operations for setting a virtual plane (hereinafter, referred to as a first virtual plane) described in connection with FIG. 11C. The electronic device may further set an additional virtual plane according to, e.g., a predetermined number of virtual planes or additional selection.

Referring back to FIG. 13A, the electronic device may set a 3D virtual space by back-projecting the second virtual plane 1303, e.g., in a vertical direction. According to an embodiment, the electronic device may be configured to interact with a virtual space set based on the first virtual plane (hereinafter, referred to as a first virtual space) and a virtual space set based on the second virtual plane 1303 (hereinafter, referred to as a second virtual space). According to another embodiment, the electronic device may form a new virtual space by combining the first virtual space and the second virtual space. If a 3D object (e.g., text or image) 1305a is input after the second virtual plane 1303 is set, the electronic device may insert the input 3D object 1305a onto the second virtual space dependently on the second virtual plane 1303 based on the first type selected from among the types of the 3D object, for example. If the 3D object 1305a partially departs from the 2D display area displaying the first image 1301 as shown in (c) of FIG. 13A, the electronic device may adjust the 3D virtual position where the 3D object 1305a is to be inserted to be positioned in the virtual space where the first virtual space and the second virtual space overlap each other. The 3D object 1305a may be moved dependently on the first virtual plane or the second virtual plane inside the virtual space where the first virtual space and the second virtual space overlap each other.

According to an embodiment, if the second virtual plane 1303 is additionally set, and the 3D object 1305a is in a state of having been dependently inserted into the prior-set first virtual plane, the electronic device may move the 3D object 1305a to the second virtual plane 1303 set so that the 3D object 1305a is dependently inserted to the second virtual plane 1303 in response to a move request. In this case, when the moved position of the 3D object 1305a is a position in the boundary line between the first virtual plane and the second virtual plane 1303, the electronic device may rotate the 3D object 1305a to be parallel to the second virtual plane 1303 and dependently insert the rotated 3D object 1305a onto the second virtual plane.

According to another embodiment, the electronic device may identify the moved position of the 3D object 1305a as the 3D object 1303a inserted onto the second virtual plane 1303 is moved to another virtual plane (e.g., the first virtual plane) as shown in FIG. 13A. When the moved position of the 3D object 1305a is a position in the boundary line between the second virtual plane 1303 and the other virtual plane (e.g., the first virtual plane), the electronic device may rotate the 3D object 1305a to be parallel to the other virtual plane (e.g., the first virtual plane) and dependently insert the rotated 3D object 1305a to the other virtual plane (e.g., the first virtual plane).

Referring back to FIG. 13B, according to an embodiment, if the second virtual plane 1303 is set and then a 3D object (e.g., text or image) 1305b is input, the electronic device may insert the input 3D object 1305b in the 3D virtual position on the second virtual space so that the 3D object 1305b interacts with the second virtual plane 1303, based on the second type selected from among the types of the 3D object 1305b. The electronic device may adjust the 3D virtual position so that the 3D object 1305b is inserted into the inside of the virtual space where the second virtual space and the first virtual space corresponding to the prior-set first virtual plane overlap each other. The electronic device may set a 3D visual effect 1307 to the 3D object 1305b. The 3D object 1305b and the 3D visual effect may be moved to interact with the first virtual plane and the second virtual plane, inside the virtual space where the first virtual space and the second virtual space overlap each other.

Figure 14:
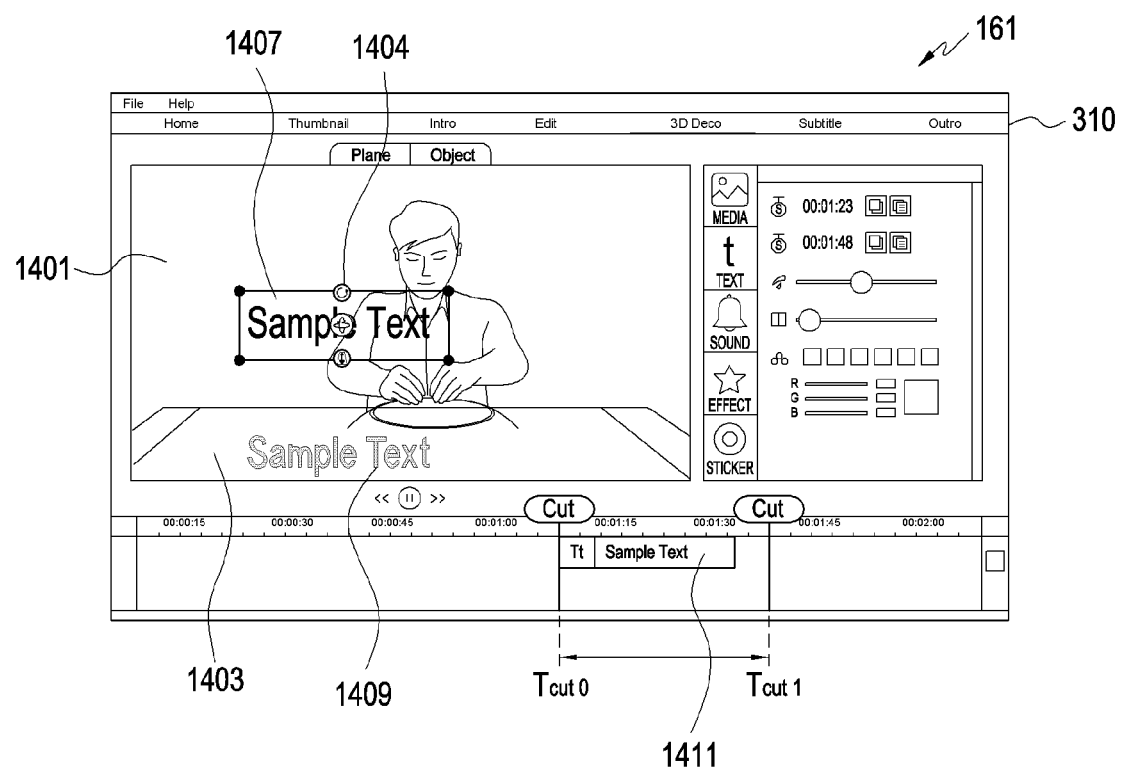
FIG. 14 is a diagram of an example of a screen for image processing in an electronic device according to an embodiment.

FIG. 14 is a diagram of an example of a screen for image processing in an electronic device according to an embodiment.

Referring to FIG. 14, according to an embodiment, the electronic device (e.g., the first electronic device 101 of FIGS. 1 and 2) may select a reproduction time period 1411 for processing in the reproduction time for image data and display a first image 1401 to be reproduced at a first time point $T_{cut0}$ of the reproduction time period 1411 on the edit execution screen (e.g., the third execution screen 1130) of the application 310 for processing. The electronic device may insert the 3D object 1407 onto the virtual space corresponding to the virtual plane 1403 described in connection with FIGS. 3A to 3D and 11E and set a 3D visual effect 1409 to the inserted 3D object 1407. The electronic device may generate a 2D second image to be mapped to or replace the first image 1401 for reproduction at the first time point $T_{cut0}$ by synthesizing the at least one first image 1401 and the 3D object inserted into the 3D virtual space as described in connection with FIG. 11E. The electronic device may generate edit images respectively corresponding to the plurality of first images by equally inserting the same 3D object 1407, inserted at the first time point $T_{cut0}$, to the plurality of first images corresponding to the reproduction time period 1411.

Figure 15A:
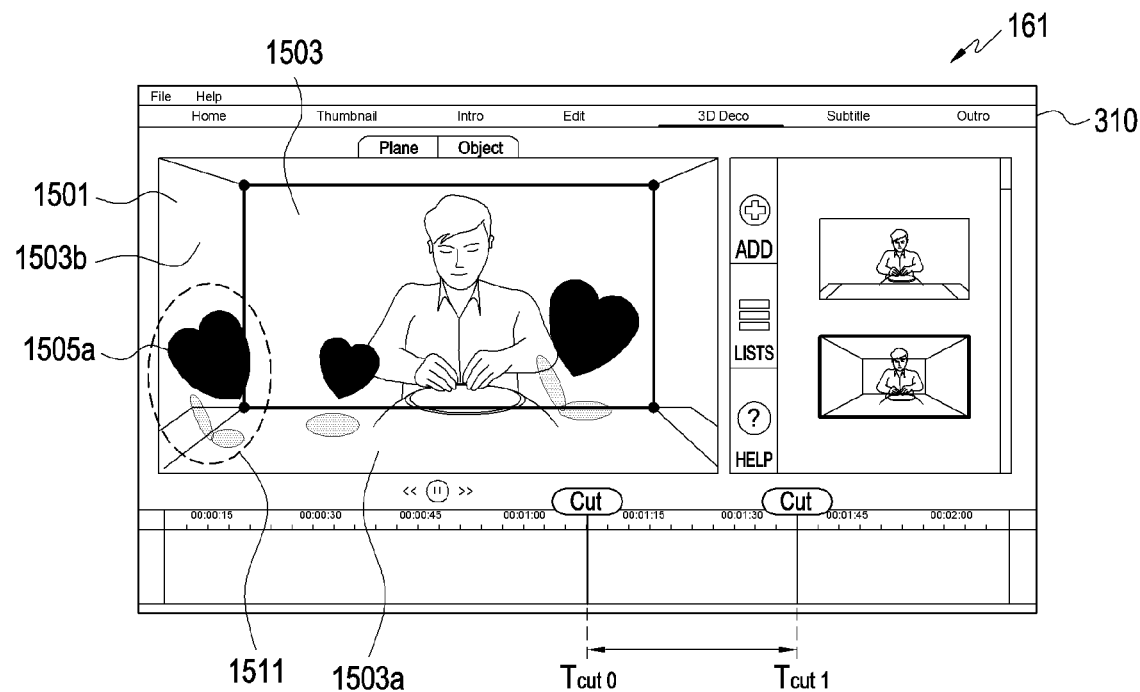
FIGS. 15A and 15B are diagrams of an example of a screen for image processing in an electronic device according to an embodiment.
Figure 15B:
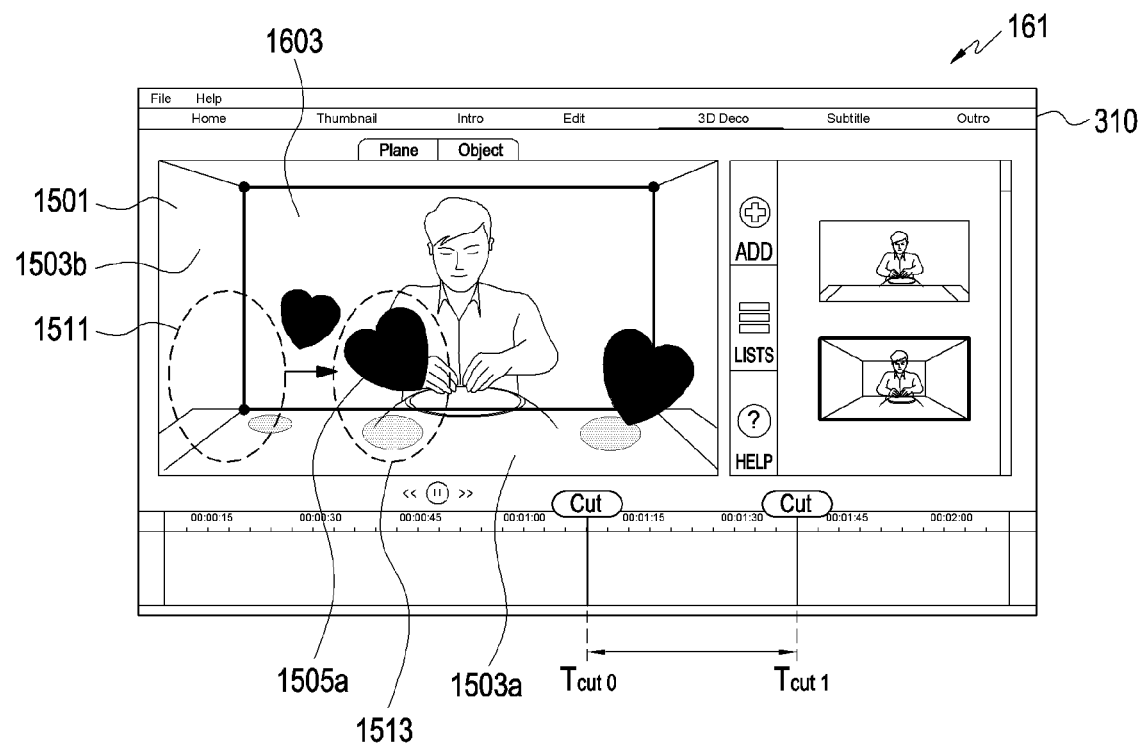

FIGS. 15A and 15B are diagrams of an example of a screen for image processing in an electronic device according to an embodiment.

Referring to FIGS. 15A and 15B, according to an embodiment, the electronic device (e.g., the first electronic device 101 of FIGS. 1 and 2) may display a first image 1501 selected from image data, on an edit execution screen (e.g., the third execution screen 1130 of FIG. 11C) of an application 310 for processing and insert at least one 3D object (e.g., a dynamic image or animation image), which is moved according to the reproduction time, on the virtual space set based on cube-shaped virtual planes (hereinafter, referred to as a cube) 1503 as described in connection with FIGS. 4A to 4D. The electronic device may insert at least one same 3D object, inserted at the first time point $T_{cut0}$, to the plurality of first images of the image data corresponding to the selected reproduction time period (e.g., the first time point $T_{cut0}$ to the second time point $T_{cut1}$). The at least one 3D object may present an effect of dynamically moving inside the cube 1503 during the reproduction time period (e.g., the first time point $T_{cut0}$ to the second time point $T_{cut1}$) upon reproducing the image data.

Referring to FIGS. 15A and 15B, the electronic device may set the 3D object 1505a to move from the 3D first virtual position 1511 inserted at the first time point $T_{cut0}$ to the virtual plane 1503b set on the left side of the virtual plane 1503a over time. At this time, the electronic device may set the 3D object 1505a to present an effect of being blocked by, and bouncing off, the virtual plane 1503b rather than further moving in the direction. For example, if the 3D object 1505a is positioned on the boundary line of the left virtual plane 1503b, the electronic device may set the 3D object 1505a to move from the direction to the virtual plane 1503b to the direction to the inside of the cube 1503. As shown in FIG. 15B, the electronic device may generate a second image by synthesizing the 3D object 1505a, which is changed in position over time, to each of the plurality of images corresponding to the reproduction time period (e.g., the first time point $T_{cut0}$ to the second time point $T_{cut1}$) so that the 3D object 1505a is moved from the first virtual position 1511 toward the inside the cube 1503 to be located in the 3D second virtual position 1513 at the second time point $T_{cut1}$.

According to another embodiment, when setting a 3D visual effect by light, e.g., on the cube-shaped virtual planes 1503 as shown in FIGS. 15A and 15B, the electronic device (e.g., the first electronic device 101 of FIGS. 1 and 2) may set the inside of the set virtual space to be bright while setting the outside of the virtual space to be dark by light, based on the virtual planes 1503. When inserting the 3D object to each of the plurality of images corresponding to the selected reproduction time period, the electronic device may set a 3D visual effect to each inserted 3D object so that the light inside the virtual space gradually brightens or gradually darkens over time when the plurality of images are reproduced.

According to various embodiments, the electronic device (e.g., the first electronic device 101 of FIGS. 1 and 2) may set attributes (e.g., the attribute of a virtual camera) for image processing, set software-wise by the processor (e.g., the processor 120 of FIGS. 1 and 2), to correspond to the physical attributes of a capturing device (e.g., the camera module 180 of FIG. 1). The electronic device may set virtual planes, similar to surfaces or wall surfaces of objects, on an actual space.

According to an embodiment, a method for image processing in an electronic device may include setting at least one virtual plane in a 3D virtual position related to at least a portion of at least one 2D first image displayed on a display of the electronic device, setting a 3D virtual space including the at least one virtual plane and the at least one first image, inserting a 3D object into the 3D virtual space, and generating at least one 2D second image by synthesizing the 3D object inserted into the 3D virtual space and the at least one first image.

According to an embodiment, the method may further include controlling the display to display the at least one second image and mapping the at least one second image with reproduction time information related to the at least one first image and storing in a memory.

According to an embodiment, the method may further include identifying a 2D position on the display to which the at least one virtual plane is projected and controlling the display to display a first control object for controlling the at least one virtual plane in the 2D position. The first control object may be displayed overlaid on some of the at least one first image displayed in the 2D position and may adjust at least one of a size, movement, rotation, or depth of the at least one virtual plane.

According to an embodiment, the method may further include, in response to an edit request, executing an application for image processing and controlling the display to display an execution screen of the application including the at least one first image and menus for processing the at least one first image.

According to an embodiment, inserting the 3D object into the 3D virtual space may include setting a first virtual position for inserting the 3D object in the virtual space based on a first type selected from among types for inserting the 3D object, the first virtual position being a 3D virtual position in which at least a portion of the 3D object is attached to the at least one virtual plane, inserting the 3D object in the first virtual position, controlling the display to display a second control object for controlling the 3D object, the second control object being displayed in a 2D position on an area of the display to which the 3D object is projected, and setting a 3D visual effect by controlling the 3D object using the second control object. The 3D object added in the first virtual position may be configured to be capable of at least one of rotation about one axis, movement or resizing with respect to two axes.

According to an embodiment, inserting the 3D object into the 3D virtual space may include setting a second virtual position for inserting the 3D object in the virtual space based on a second type selected from among types for inserting the 3D object, the second virtual position being a 3D virtual position in which the 3D object does not overlap the at least one virtual plane, inserting the 3D object in the second virtual position, controlling the display to display a third control object for controlling the 3D object, the third control object being displayed in a 2D position on an area of the display to which the 3D object is projected, and setting a 3D visual effect by controlling the 3D object using the third control object.

According to an embodiment, the 3D object added in the second virtual position may be configured to be capable of at least one of rotation about three axes, movement or resizing with respect to the three axes.

According to an embodiment, inserting the 3D object into the 3D virtual space may include, when the at least one virtual plane includes a plurality of virtual planes, setting a 3D visual effect to the 3D object so that the 3D object dynamically moves within the virtual space without departing from the plurality of virtual planes in the virtual space set by the plurality of virtual planes.

According to an embodiment, inserting the 3D object into the 3D virtual space may include identifying a moved position of the 3D object, in response to a request for moving the 3D object from a first virtual plane among the at least one virtual plane to a second virtual plane, rotating the 3D object to allow the moved position of the 3D object to be parallel with the second virtual plane when the moved position of the 3D object is a position in a boundary line of the second virtual plane, and inserting the rotated 3D object onto the second virtual plane.

According to an embodiment, the method may further include obtaining a plurality of images included in a reproduction time period from a first time to a second time for reproducing image data including the at least one first image, generating 2D second images respectively corresponding to the plurality of images by equally applying the 3D object, inserted to the virtual space, to each of the plurality of images, and mapping or replacing a plurality of first images included in the reproduction time period with the 2D second images, respectively, and storing them in the memory.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The storage medium (e.g., the internal memory 136 or external memory 138) readable by a machine (e.g., the electronic device 101) may include hard disks, floppy disks, magnetic media (e.g., magnetic tapes), optical media (e.g., compact disc read only memories (CD-ROMs), digital versatile discs (DVDs), or magneto-optical media (e.g., floptical disks)), or hardware devices (e.g., read only memories (ROMs), random access memories (RAMs), or flash memories). The above-described hardware devices may be configured to operate as one or more software modules to carry out various embodiments, and vice versa.

According to an embodiment, a non-transitory storage medium may store instructions that, when executed by a processor of an electronic device, enable the electronic device to perform setting at least one virtual plane in a 3D virtual position related to at least a portion of at least one 2D first image displayed on a display of the electronic device, setting a 3D virtual space including the at least one virtual plane and the at least one first image, inserting a 3D object into the 3D virtual space, and generating at least one 2D second image by synthesizing the 3D object inserted into the 3D virtual space and the at least one first image.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device comprising:
memory;
a display; and
at least one processor,
wherein the memory stores instructions that, when executed by the at least one processor, cause the electronic device to:
display at least one two-dimensional (2D) first image on the display;
set at least one virtual plane in a three-dimensional (3D) virtual position with respect to the at least one 2D first image displayed on the display,
set a 3D virtual space comprising the at least one virtual plane and the at least one 2D first image,
receive a selection of a first type of 3D object from among a plurality of types of 3D objects for insertion in the 3D virtual space, the plurality of types of 3D objects comprising the first type of 3D object corresponding to a plane attach type in which the 3D object is attached to the at least one virtual plane and a second type of 3D object corresponding to a plane interaction type in which the 3D object does not overlap the at least one virtual plane,
set a first virtual position for inserting a 3D object in the 3D virtual space based on the first type of 3D object selected from among the plurality of types of 3D objects, the first virtual position being a 3D virtual position in which at least a portion of the 3D object is attached to the at least one virtual plane,
insert the 3D object into the 3D virtual space at the first virtual position,
identify a position on the at least one 2D first image to which the at least one virtual plane is projected,
control the display to display a first control object for controlling the at least one virtual plane in the identified position on the at least one 2D first image, and
generate at least one 2D second image by synthesizing the 3D object inserted into the 3D virtual space with the at least one 2D first image that is displayed on the display, and
wherein the first control object is configured to adjust at least one of a size, movement, rotation, or depth of the at least one virtual plane.

2. The electronic device of claim 1, wherein the instructions further cause the electronic device to:
control the display to display the at least one 2D second image,
map the at least one 2D second image with reproduction time information related to the at least one 2D first image, and
store the mapped at least one 2D second image in the memory.

3. The electronic device of claim 1, wherein the instructions further cause the electronic device to:
based on an edit request, execute an application for image processing and control the display to display an execution screen of the application comprising the at least one 2D first image and menus for processing the at least one 2D first image, and wherein the first control object is overlaid on a portion of the at least one 2D first image displayed in the 2D position.

4. The electronic device of claim 1, wherein the instructions further cause the electronic device to:
control the display to display a second control object for controlling the 3D object, the second control object being displayed in a 2D position on an area of the display to which the 3D object is projected, and
set a 3D visual effect by controlling the 3D object using the second control object, and
wherein the 3D object added in the first virtual position is configured to be capable of at least one of rotation about one axis, movement or resizing with respect to two axes.

5. The electronic device of claim 1, wherein the instructions further cause the electronic device to:
set a second virtual position for inserting the 3D object in the 3D virtual space based on the second type selected from among the plurality of types of 3D objects, the second virtual position being a 3D virtual position in which the 3D object does not overlap the at least one virtual plane,
add the 3D object in the second virtual position,
control the display to display a third control object for controlling the 3D object, the third control object being displayed in a 2D position on an area of the display to which the 3D object is projected, and
set a 3D visual effect by controlling the 3D object using the third control object,
wherein the 3D object added in the second virtual position is configured to be capable of at least one of rotation about three axes, movement or resizing with respect to the three axes.

6. The electronic device of claim 1, wherein the instructions further cause the electronic device to:
set an additional virtual plane based on a predetermined number of virtual planes or an additional selection, and
based on the at least one virtual plane comprising a plurality of virtual planes, set a 3D visual effect to the 3D object such that the 3D object dynamically moves within the 3D virtual space without departing from the plurality of virtual planes in the 3D virtual space set by the plurality of virtual planes.

7. The electronic device of claim 1, wherein the instructions further cause the electronic device to:
identify a moved position of the 3D object, based on a request for moving the 3D object from a first virtual plane among the at least one virtual plane to a second virtual plane,
rotate the 3D object to allow the moved position of the 3D object to be parallel with the second virtual plane based on the moved position of the 3D object being a position in a boundary line of the second virtual plane, and
insert the rotated 3D object into the second virtual plane.

8. The electronic device of claim 1, wherein the instructions further cause the electronic device to:
obtain a plurality of first images included in a reproduction time period from a first time for reproducing image data comprising the at least one 2D first image to a second time, the plurality of first images comprising the at least one 2D first image,
generate 2D second images respectively corresponding to the plurality of first images by applying the 3D object, inserted into the 3D virtual space, to each of the plurality of first images, and
map the plurality of first images included in the reproduction time period to each of the 2D second images, or replace the plurality of first images with the 2D second images and store the 2D second images in the memory.

9. A method for image processing in an electronic device, the method comprising:
displaying at least one two-dimensional (2D) first image on a display of the electronic device;
setting at least one virtual plane in a three-dimensional (3D) virtual position with respect to the at least one 2D first image displayed on the display of the electronic device;
setting a 3D virtual space comprising the at least one virtual plane and the at least one 2D first image;
receiving a selection of a first type of 3D object from among a plurality of types of 3D objects for insertion in the 3D virtual space, the plurality of types of 3D objects comprising the first type of 3D object corresponding to a plane attach type in which the 3D object is attached to the at least one virtual plane and a second type of 3D object corresponding to a plane interaction type in which the 3D object does not overlap the at least one virtual plane;
setting a first virtual position for inserting a 3D object in the 3D virtual space based on the first type of 3D object selected from among the plurality of types of 3D objects, the first virtual position being a 3D virtual position in which at least a portion of the 3D object is attached to the at least one virtual plane;
inserting the 3D object into the 3D virtual space at the first virtual position;
identifying a position on the at least one 2D first image to which the at least one virtual plane is projected;
controlling the display to display a first control object for controlling the at least one virtual plane in the identified position on the at least one 2D first image; and
generating at least one 2D second image by synthesizing the 3D object inserted into the 3D virtual space with the at least one 2D first image that is displayed on the display of the electronic device,
wherein the first control object is configured to adjust at least one of a size, movement, rotation, or depth of the at least one virtual plane.

10. The method of claim 9, further comprising:
controlling the display to display the at least one 2D second image;
mapping the at least one 2D second image with reproduction time information related to the at least one 2D first image; and
storing the mapped at least one 2D second image in a memory.

11. The method of claim 9, wherein the first control object is overlaid on a portion of the at least one 2D first image displayed in the 2D position, and
wherein the method further comprises, based on an edit request, executing an application for image processing and controlling the display to display an execution screen of the application comprising the at least one 2D first image and menus for processing the at least one 2D first image.

12. The method of claim 9, wherein the inserting the 3D object into the 3D virtual space comprises:
controlling the display to display a second control object for controlling the 3D object, the second control object being displayed in a 2D position on an area of the display to which the 3D object is projected; and setting a 3D visual effect by controlling the 3D object using the second control object, and wherein the 3D object added in the first virtual position is configured to be capable of at least one of rotation about one axis, movement or resizing with respect to two axes.

13. The method of claim 9, wherein the inserting the 3D object into the 3D virtual space comprises:

setting a second virtual position for inserting the 3D object in the 3D virtual space based on the second type selected from among the plurality of types of 3D objects, the second virtual position being a 3D virtual position in which the 3D object does not overlap the at least one virtual plane;

adding the 3D object to the second virtual position;

controlling the display to display a third control object for controlling the 3D object, the third control object being displayed in a 2D position on an area of the display to which the 3D object is projected; and setting a 3D visual effect by controlling the 3D object using the third control object, and wherein the 3D object added in the second virtual position is configured to be capable of at least one of rotation about three axes, movement or resizing with respect to the three axes.

14. The method of claim 9, wherein the inserting the 3D object into the 3D virtual space comprises:

identifying a moved position of the 3D object, based on a request for moving the 3D object from a first virtual plane among the at least one virtual plane to a second virtual plane;

rotating the 3D object to allow the moved position of the 3D object to be parallel with the second virtual plane based on the moved position of the 3D object being a position in a boundary line of the second virtual plane; and inserting the rotated 3D object into the second virtual plane.

15. A non-transitory computer-readable storage medium storing instructions that, when executed by a processor of an electronic device, cause the electronic device to:

display at least one two-dimensional (2D) first image on a display of the electronic device;

set at least one virtual plane in a three-dimensional (3D) virtual position with respect to the at least one 2D first image displayed on the display of the electronic device;

set a 3D virtual space comprising the at least one virtual plane and the at least one 2D first image;

receive a selection of a first type of 3D object from among a plurality of types of 3D objects for insertion in the 3D virtual space, the plurality of types of 3D objects comprising the first type of 3D object corresponding to a plane attach type in which the 3D object is attached to the at least one virtual plane and a second type of 3D object corresponding to a plane interaction type in which the 3D object does not overlap the at least one virtual plane;

set a first virtual position for inserting a 3D object in the 3D virtual space based on the first type of 3D object selected from among the plurality of types of 3D objects, the first virtual position being a 3D virtual position in which at least a portion of the 3D object is attached to the at least one virtual plane;

insert the 3D object into the 3D virtual space at the first virtual position;

identify a position on the at least one 2D first image to which the at least one virtual plane is projected;

control the display to display a first control object for controlling the at least one virtual plane in the identified position on the at least one 2D first image; and generate at least one 2D second image by synthesizing the 3D object inserted into the 3D virtual space with the at least one 2D first image that is displayed on the display of the electronic device, wherein the first control object is configured to adjust at least one of a size, movement, rotation, or depth of the at least one virtual plane.

\* \* \* \* \*